United States Patent
Ryoshi et al.

(10) Patent No.: US 9,882,204 B2
(45) Date of Patent: Jan. 30, 2018

(54) NICKEL COMPOSITE HYDROXIDE, CATHODE ACTIVE MATERIAL FOR NON-AQUEOUS ELECTROLYTE SECONDARY BATTERY, AND METHODS FOR PRODUCING THESE

(71) Applicant: SUMITOMO METAL MINING CO., LTD., Minato-ku, Tokyo (JP)

(72) Inventors: Kazuomi Ryoshi, Niihama (JP); Kensaku Mori, Niihama (JP)

(73) Assignee: SUMITOMO METAL MINING CO., LTD., Tokyo (JP)

( * ) Notice: Subject to any disclaimer, the term of this patent is extended or adjusted under 35 U.S.C. 154(b) by 59 days.

(21) Appl. No.: 14/406,207

(22) PCT Filed: Jun. 6, 2013

(86) PCT No.: PCT/JP2013/065702
§ 371 (c)(1),
(2) Date: Dec. 6, 2014

(87) PCT Pub. No.: WO2013/183711
PCT Pub. Date: Dec. 12, 2013

(65) Prior Publication Data
US 2015/0155548 A1    Jun. 4, 2015

(30) Foreign Application Priority Data
Jun. 6, 2012 (JP) ................................. 2012-129311

(51) Int. Cl.
*H01M 4/525* (2010.01)
*H01M 4/36* (2006.01)
(Continued)

(52) U.S. Cl.
CPC ............. *H01M 4/364* (2013.01); *B82Y 30/00* (2013.01); *C01G 53/00* (2013.01); *C01G 53/006* (2013.01);
(Continued)

(58) Field of Classification Search
CPC .............................. H01M 4/525; H01M 4/505
See application file for complete search history.

(56) References Cited

U.S. PATENT DOCUMENTS

2002/0039683 A1* 4/2002 Kihara ................. C01G 53/006
429/223
2007/0292758 A1   12/2007 Uchida et al.
(Continued)

FOREIGN PATENT DOCUMENTS

JP    07-165428 A    6/1995
JP    08-119636      5/1996
(Continued)

OTHER PUBLICATIONS

International Search Report and Written Opinion dated Sep. 10, 2013, from the corresponding PCT/JP2013/065702.
(Continued)

*Primary Examiner* — Olatunji Godo
(74) *Attorney, Agent, or Firm* — Katten Muchin Rosenman LLP

(57) ABSTRACT

A nickel composite hydroxide having a volume-average particle size of the secondary particles of 8.0 μm to 50.0 μm is obtained, by obtaining a nickel composite hydroxide slurry in a primary crystallization process by providing an aqueous solution having at least a nickel salt and a neutralizer into a reaction vessel while continuously stirring in a state of not containing a complex ion formation agent, and controlling the crystallization reaction so that the ratio of the volume-average particles size of secondary particles with
(Continued)

respect to that of the secondary particles finally obtained is 0.2 to 0.6, and producing the nickel composite hydroxide in a secondary crystallization process by continuing the crystallization process while keeping the amount of the obtained slurry constant, continuously removing only the liquid component of the slurry, and performing control so that the slurry has a temperature of 70° C. to 90° C. and a pH value at a standard liquid temperature of 25° C. of 10.0 to 11.0.

11 Claims, 2 Drawing Sheets

(51) Int. Cl.
| | | |
|---|---|---|
| *C01G 53/00* | (2006.01) | |
| *H01M 4/505* | (2010.01) | |
| *B82Y 30/00* | (2011.01) | |
| *H01M 4/131* | (2010.01) | |
| *H01M 10/052* | (2010.01) | |
| *H01M 4/02* | (2006.01) | |

(52) U.S. Cl.
CPC ............ *C01G 53/40* (2013.01); *C01G 53/42* (2013.01); *H01M 4/131* (2013.01); *H01M 4/505* (2013.01); *H01M 4/525* (2013.01); *C01P 2002/60* (2013.01); *C01P 2004/03* (2013.01); *C01P 2004/51* (2013.01); *C01P 2004/54* (2013.01); *C01P 2004/64* (2013.01); *C01P 2006/40* (2013.01); *H01M 10/052* (2013.01); *H01M 2004/028* (2013.01)

(56) References Cited

U.S. PATENT DOCUMENTS

| | | | |
|---|---|---|---|
| 2009/0029253 A1* | 1/2009 | Itou | H01M 4/525 |
| | | | 429/223 |
| 2011/0180748 A1 | 7/2011 | Jahn et al. | |
| 2012/0276454 A1* | 11/2012 | Mori | H01M 4/485 |
| | | | 429/223 |
| 2013/0337331 A1 | 12/2013 | Mori et al. | |

FOREIGN PATENT DOCUMENTS

| | | | |
|---|---|---|---|
| JP | 10-025117 | | 1/1998 |
| JP | 10-228906 A | | 8/1998 |
| JP | 11-001324 A | | 1/1999 |
| JP | 2006-151795 A | | 6/2006 |
| JP | 2010-536697 | | 12/2010 |
| JP | 4840545 B1 | | 12/2011 |
| WO | WO2011067937 | * | 6/2011 |
| WO | 2012/131779 A1 | | 10/2012 |

OTHER PUBLICATIONS

International Preliminary Report on Patentability dated Dec. 9, 2014, from the corresponding PCT/JP2013/065702.
Office Action dated May 20, 2014, from the corresponding Japanese Patent Application No. 2014-506638.

* cited by examiner

NICKEL COMPOSITE HYDROXIDE, CATHODE ACTIVE MATERIAL FOR NON-AQUEOUS ELECTROLYTE SECONDARY BATTERY, AND METHODS FOR PRODUCING THESE

TECHNICAL FIELD

The present invention relates to a nickel composite hydroxide that is used as a precursor for a cathode active material for a non-aqueous electrolyte secondary battery and production method thereof, a cathode active material for a non-aqueous electrolyte secondary battery and production method thereof, and a non-aqueous electrolyte secondary battery that uses this cathode active material as cathode material.

BACKGROUND ART

In recent years, as portable devices such as portable telephones and notebook computers have spread, the development of a compact and lightweight secondary battery having a high energy density is desired. As this kind of secondary battery is a lithium-ion secondary battery that uses lithium, lithium alloy, metal oxide or carbon as the anode, and research and development of such a secondary battery is being actively performed.

A lithium-ion secondary battery that uses a lithium composite oxide, and particularly, a lithium cobalt composite oxide capable of being relatively easily synthesized for the cathode material is able to obtain high 4V class voltage, so is expected to become a battery having a high energy density, and practical application of such a battery is advancing. In regards to batteries that use lithium cobalt composite oxide, much development has been performed in order to obtain excellent initial capacity characteristics and cycling characteristics, and various results have been obtained.

However, lithium cobalt composite oxide uses a cobalt compound which is rare and expensive as a raw material, and so causes the cost of the cathode material and lithium-ion secondary battery to increase. A lithium-ion secondary battery that uses lithium cobalt composite oxide as the cathode material has a unit cost per capacity that is approximately four times that of a nickel-metal hydride battery, so uses and applications are quite limited. Therefore, lowering the cost of the cathode material, and making it possible to produce a less expensive lithium-ion secondary battery has large industrial significance from the aspect of promoting more lightweight and compact portable devices.

As a cathode active material that can alternate for the lithium cobalt composite oxide is a lithium nickel composite oxide that uses nickel, which is less expensive than cobalt. Compared to a lithium cobalt composite oxide, a lithium nickel composite oxide displays a lower electrochemical potential, and decomposition due to oxidation of the electrolyte does not easily pose a problem, so achieving a high capacity is expected. Moreover, as in the case of a lithium cobalt composite oxide, lithium nickel composite oxide displays a high battery voltage. For these reasons, currently, much research is being actively carried out for a lithium nickel composite oxide that can be applied as a cathode active material for a lithium-ion secondary battery.

In order to obtain the excellent battery characteristics, or in other words, high output, low resistance, high cycling and high capacity of the lithium-ion secondary battery, it is necessary for the cathode active material to be composed of particles that have a uniform particle size, and that come in suitable contact with the electrolyte.

For example, in order to achieve battery characteristics such as high output and low resistance, sufficient contact between the cathode active material and the electrolyte must be maintained. When the contact between the cathode active material and the electrolyte is not sufficient, the reaction surface area cannot be sufficiently maintained, and the reaction resistance increases, so a high-output battery cannot be obtained. Moreover, the cycling characteristic is related to the particle size distribution, and using a cathode active material having a wide particle size distribution causes the voltage that is applied to the particles inside the electrode to become uneven, and when charging and discharging are repeated, fine particles selectively deteriorate and the capacity is decreased. Furthermore, the battery capacity is closely related to the filling ability (packing density) of the cathode active material. More specifically, when the packing density is high, it is possible to fill a larger amount of cathode active material inside an electrode having the same volume, so it is possible to increase the battery capacity. As a method for increasing the packing density, increasing the particle size when the particle density is the same is effective. However, mixing in particles having too large of a particle size will cause the filter to clog when performing filtering after mixing the cathode paste, and will cause thin and long shaped defective parts to occur during coating.

Here, the lithium nickel composite oxide used as the cathode active material is obtained by calcining a nickel composite hydroxide precursor together with a lithium compound. The particle characteristics such as the particle size and particle size distribution of the cathode active material are basically inherited from the particle characteristics of the nickel composite hydroxide precursor. Therefore, in order to obtain a desired particle size and particle size distribution of the cathode active material, it is necessary to obtain such a particle size and particle size distribution in the precursor stage.

The reactive crystallization method is typically used as a method for producing a nickel composite hydroxide precursor. In order to obtain particles having a sharp particle size distribution, a method of performing crystallization in a batch operation is effective, however, the batch method has a disadvantage in that productivity is worse than in a continuous method that uses an overflow technique. Furthermore, in order to obtain large particles in a batch operation, it is necessary to increase the amount of raw material that is supplied, and as a result, the reaction vessel must be larger, thus productivity becomes even worse.

Therefore, in order to improve the productivity, a method of suppressing increasing capacity of the reaction system by discharging solvent to outside the system while performing crystallization in a batch operation is being studied. For example, JPH 08-119636 (A) discloses a method of generating nickel hydroxide particles by continuously supplying a nickel salt aqueous solution, ammonia water, and a alkali hydroxide aqueous solution at the fixed ratio into a reaction vessel, removing medium solution so as to mix the reaction liquid before the reaction system overflows from the reaction vessel, and then repeatedly increasing the amount of the reaction system by supplying the reaction liquid and decreasing the amount by removing the medium solution. However, in this method, because increasing the amount of the reaction system by supplying the reaction liquid and decreasing the amount by removing the medium solution is performed repeatedly, there is a problem in that the number of particles per volume of solvent fluctuates, it becomes easy for particle growth to become unstable, and the particle size distribution becomes bad due to fine particles that are newly generated during the reaction.

Moreover, JPH 07-165428 (A) discloses a method of simultaneously and continuously supplying a nickel salt aqueous solution, ammonia water and alkali hydroxide aqueous solution at the fixed ratio to a reaction vessel having a filtering function, and after the amount of the reaction system has reached a specified amount, continuously removing the medium solution from the reaction vessel by using the filtering function, and causing the reaction to occur under a mixing condition while keeping the amount of the reaction system nearly constant. With this method, medium solution is continuously removed, so the number of particles per volume of solvent becomes constant, and particle growth is stable. However, according to the disclosed example, the ratio of the amount of raw material that is supplied after removal of the medium solution has started with respect to the amount of raw material that is supplied up until removal of the medium solution is started is large, and the rate of growth from the particle size of particles that are generated in the initial stage of crystallization to the particle size of the particles in the final stage of crystallization becomes large, so there is a possibility that fine powder will be generated in the reaction solution. Moreover, supposing that the number of particles does not fluctuate and the density remains constant, then, for example, in order to grow 2 μm particles to 12 μm particles, it is necessary to increase the volume by a factor of 216. Therefore, in order to the keep the concentration of the slurry to which raw material has been added in a stirrable state until the particles grow to 12 μm, the initial slurry concentration must be made low. Due to this, a problem occurs in that the time for supplying raw material and causing the raw material to react becomes long, and the productivity is decreased. From the above, it can be easily imagined that by using the method disclosed in JPH 07-165428 (A), producing particles having a large particle size is extremely difficult.

On the other hand, JPH 10-025117 (A) and JP 2010-536697 (A) disclose a method of discharging not only solvent but also particles to outside the reaction system in order to keep the slurry concentration inside the reaction system constant. In these methods, particles that were discharged to outside the reaction system are returned to the reaction system, however, if the particles are not returned to the reaction system, the number of particles in the reaction system decreases, so by causing particle growth in this state it is possible to increase the particle size. However, as in the case of the continuous crystallization operation by overflow, fine particles that have not grown sufficiently, or rough particles that have grown too much are mixed in, so it is difficult to obtain particles having a sharp particle size distribution.

Moreover, in all of the Cited Literature above, the point of maintaining sufficient contact between the cathode active material that is obtained from the nickel composite hydroxide and the electrolyte has not been examined.

As was described above, a method for producing nickel composite hydroxide in an industrial production process such that the nickel composite hydroxide has particles of a suitable size, the particle size distribution is narrow and sufficient contact with the electrolyte can be maintained has not yet been established.

RELATED LITERATURE

Patent Literature

[Patent Literature 1] JPH 08-119636 (A)
[Patent Literature 2] JPH 07-165428 (A)
[Patent Literature 3] JPH 10-025117 (A)
[Patent Literature 4] JP 2010-536697 (A)

SUMMARY OF INVENTION

Problems to be Solved by Invention

In consideration of the problem described above, the object of the present invention is to provide a cathode active material for a non-aqueous electrolyte secondary battery that has a uniform particle size, a high packing density, is capable of maintaining sufficient contact surface area with the electrolyte, is capable of increasing the capacity and output, lowering the resistance and improving the cycling characteristic of the battery, and provide a nickel composite hydroxide precursor that makes it possible to provide such a cathode active material for a non-aqueous electrolyte secondary battery.

Means for Solving Problems

The inventors, as a result of diligent research for improving productivity of nickel composite hydroxide by a batch method, and for making particles more uniform, completed the present invention by gaining knowledge on how a complex ion formation agent greatly affects the generation of fine particles of nickel composite hydroxide and the structure of secondary particles in the process of concentrating the reaction aqueous solution in order to improve productivity.

In other words, the production method for a nickel composite hydroxide of the present invention is a method for producing a nickel composite hydroxide by a crystallization reaction by providing an aqueous solution, which includes at least a nickel salt, and a neutralizer into a reaction vessel while continuously stirring in a state that does not include a complex ion formation agent for forming complex ions with metal elements in the reaction aqueous solution, including:

a primary crystallization process of obtaining a nickel composite hydroxide while controlling the crystallization reaction so that the ratio of the volume-average particles size (MV) of secondary particles of nickel composite hydroxide generated in the reaction vessel with respect to the volume-average particle size (MV) of secondary particles of nickel composite hydroxide that are finally obtained is 0.2 to 0.6; and a secondary crystallization process of continuing the crystallization process by keeping the amount of slurry obtained in the primary crystallization process constant by continuously removing only the liquid component of the slurry while maintaining the state of not including a complex ion formation agent, and performing control so that the slurry temperature is in the range of 70° C. to 90° C., and the pH value at a standard liquid temperature of 25° C. is in the range of 10.0 to 11.0 until the volume-average particle size (MV) of the secondary particles of nickel composite hydroxide becomes 8.0 μm to 50.0 μm.

In the primary crystallization process, preferably control is performed so that the slurry temperature is in the range of 70° C. to 90° C., and the pH value at a standard liquid temperature of 25° C. is in the range of 10.0 to 11.0.

Preferably, the composition of the aqueous solution that includes the nickel salt is adjusted so that the nickel composite hydroxide has a composition ratio that is expressed by the general expression: $Ni_{1-x-y}Co_xM_y(OH)_{2+A}$ (where $0 \leq x \leq 0.35$, $0 \leq y \leq 0.35$, $0 \leq A \leq 0.5$, and M is at least one additional element selected from Mn, V, Mg, Al, Ti, Mo, Nb, Zr and W), and more preferably, the composition of the aqueous solution that includes the nickel salt is adjusted so that the nickel composite hydroxide has a composition ratio that is expressed by the general expression: $Ni_{1-x-y}Co_xM_y(OH)_{2+A}$ (where $0 \leq x \leq 0.22$, $0 \leq y \leq 0.15$, $x+y<0.3$, $0 \leq A \leq 0.5$, and M is at least one additional element selected from Mn, V, Mg, Al, Ti, Mo, Nb, Zr and W).

In the secondary crystallization process, preferably, crystallization is continued until the volume-average particle size (MV) of the nickel composite hydroxide becomes 18.0 μm to 50.0 μm.

In the secondary crystallization process, preferably, a cross-flow filtration unit is used to keep the amount of slurry fixed, and more preferably, a ceramic filter is used as the filter material in the cross-flow filtration unit.

Moreover, the nickel composite hydroxide of the present invention comprises spherical shaped secondary particles of nickel composite hydroxide that are formed by an aggregation of plural needle shaped or plate shaped primary particles, with the length in the short-diameter direction of the primary particles preferably being 0.1 μm or less, and more preferably no less than 0.01 μm and no greater than 0.06 μm, the volume-average particle size (MV) of the secondary particles preferably being 8.0 μm to 50.0 μm, and more preferably 18.0 μm to 50.0 μm, and (D90−D10)/MV that indicates the relationship of the particles size distribution to the volume-average particle size (MV) being less than 0.5.

The nickel composite hydroxide preferably has a composition that is expressed by the general expression: $Ni_{1-x-y}Co_xM_y(OH)_{2+A}$ (where $0 \leq x \leq 0.35$, $0 \leq y \leq 0.35$, $0 \leq A \leq 0.5$, and M is at least one additional element selected from Mn, V, Mg, Al, Ti, Mo, Nb, Zr and W), and more preferably has a composition that is expressed by the general expression: $Ni_{1-x-y}Co_xM_y(OH)_{2+A}$ (where $0 \leq x \leq 0.22$, $0 \leq y \leq 0.15$, $x+y<0.3$, $0 \leq A \leq 0.5$, and M is at least one additional element selected from Mn, V, Mg, Al, Ti, Mo, Nb, Zr and W).

The method for producing a cathode active material for a non-aqueous electrolyte secondary battery of the present invention, includes:

a mixing process of forming a lithium mixture by mixing the nickel composite hydroxide of the present invention, or a nickel composite oxide that is obtained by roasting the nickel composite hydroxide of the present invention in an oxidizing atmosphere at 300° C. to 1,000° C. with a lithium compound; and a calcination process of obtaining a lithium nickel composite oxide by calcining the lithium mixture in an oxidizing atmosphere at 650° C. to 950° C.

The cathode active material for a non-aqueous electrolyte secondary battery of the present invention is such that the volume-average particle size (MV) of secondary particles of lithium nickel composite oxide of the cathode active material is 8.0 μm to 50.0 μm, and preferably 18.0 μm to 50.0 μm, (D90−D10)/MV that indicates the relationship of the particles size distribution to the volume-average particle size (MV) is less than 0.5, and the crystallite diameter that is found by the Scherrer method from the (003) plane peak in X-ray diffraction is 30 nm to 150 nm.

The cathode active material for a non-aqueous electrolyte secondary battery is preferably formed from a lithium nickel composite oxide having a composition that is expressed by the general expression: $Li_{1+u}Ni_{1-x-y}Co_xM_yO_2$ (where $-0.05 \leq u \leq 0.50$, $0 \leq x \leq 0.35$, $0 \leq y \leq 0.35$, and M is at least one additional element that is selected from Mn, V, Mg, Al, Ti, Mo, Nb, Zr and W), and preferably is formed from a lithium nickel composite oxide having a composition that is expressed by the general expression: $Li_{1+u}Ni_{1-x-y}Co_xM_yO_2$ (where $-0.05 \leq u \leq 0.20$, $0 \leq x \leq 0.22$, $0 \leq y \leq 0.15$, $x+y<0.3$, and M is at least one additional element that is selected from Mn, V, Mg, Al, Ti, Mo, Nb, Zr and W).

The non-aqueous electrolyte secondary battery of the present invention is such that the cathode active material for a non-aqueous electrolyte secondary battery of the present invention is used as the cathode material.

Effect of Invention

With the present invention, it is possible to obtain a nickel composite hydroxide having uniform particles and high packing density as a precursor to a cathode active material for a non-aqueous electrolyte secondary battery without obstructing productivity. Moreover, by using this nickel composite hydroxide as a precursor, it becomes possible to easily obtain a cathode active material that is capable of increasing battery capacity, increasing battery output, and improving battery cycling characteristics when that cathode active material is used as the cathode material of a battery. Therefore, the present invention can be said to have a very high industrial value.

MODES FOR CARRYING OUT INVENTION

Figure 1:
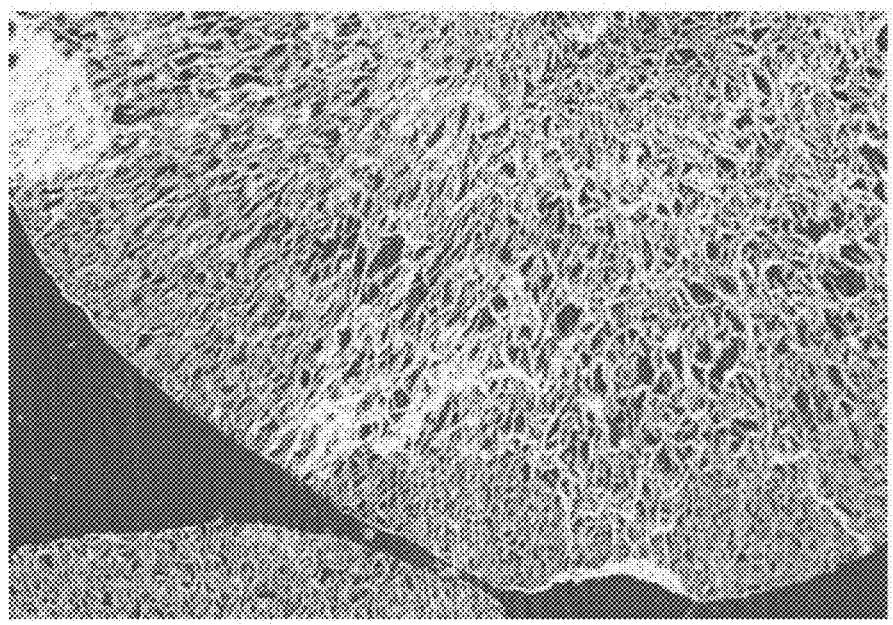
FIG. 1 is a cross-sectional SEM photograph (observation magnification rate: 5000×) of the nickel composite hydroxide of the present invention.
Figure 2:
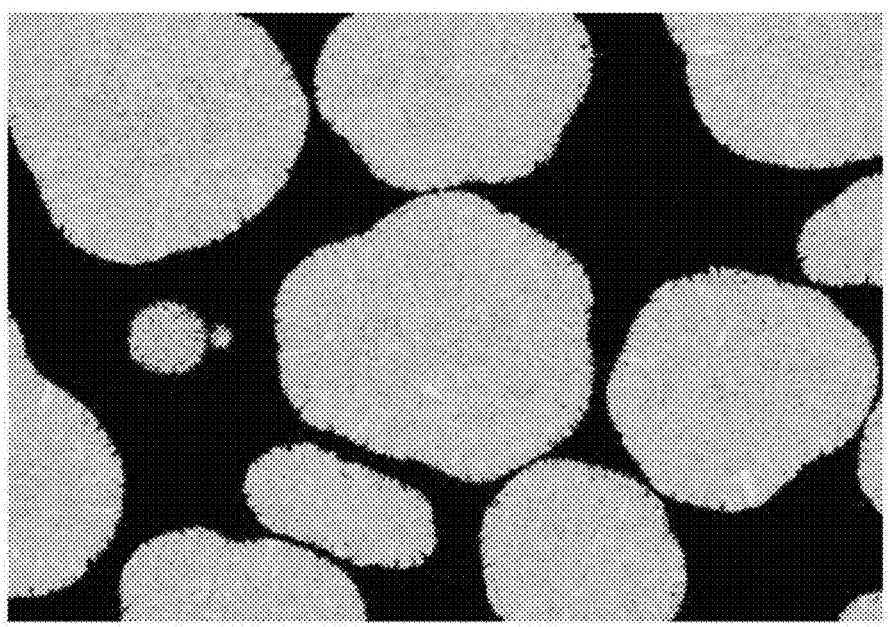
FIG. 2 is a cross-sectional SEM photograph (observation magnification rate: 5000×) of a nickel composite hydroxide that was produced using a complex ion formation agent in the primary crystallization process and secondary crystallization process.

The present invention relates to: (1) a nickel composite hydroxide that is used as a precursor for a cathode active material for a non-aqueous electrolyte secondary battery, and the production method thereof; (2) cathode active material for a non-aqueous electrolyte secondary battery, and the production method thereof; and (3) a non-aqueous electrolyte secondary battery in which this cathode active material for a non-aqueous electrolyte secondary battery is used as the cathode material. In the following, the invention of (1) to (3) above will be explained in detail, however, first, the main feature of the present invention, which is the nickel composite hydroxide, and the production method thereof, will be explained.

(1-1) Production Method for Nickel Composite Hydroxide

Conventionally, when trying to obtain a nickel composite hydroxide using a crystallization process, metal elements such as nickel and a complex ion formation agent, for example, an ammonium ion donor such as an ammonia aqueous solution, or acetic acid, citric acid or the like for forming a chelate complex with these metals are used.

However, when this kind of complex ion formation agent is used, the solubility of the metals in the reaction solution increases, so it becomes difficult to form fine primary particles. Moreover, during the crystallization process, fluctuation in concentration occurs due to volatilization of the complex ion formation agent, so a problem occurs in that it becomes difficult to control the crystallization location. Furthermore, by using a complex ion formation agent, the load of processing the effluent increases, so it becomes difficult to lower the cost of the product. On the other hand, when the crystallization process is performed without using a complex ion formation agent, even though it is possible to generate fine primary particles, there is a problem in that the particle size distribution becomes bad due to the generation of the fine particles.

In regards to such problems, in the present invention, the crystallization process is divided into two stages: a primary crystallization process for obtaining a nickel composite hydroxide slurry by continuously supplying an aqueous solution, which includes at least a nickel salt, and a neutralizer to the reaction aqueous solution while stirring; and a secondary crystallization process of continuing crystallization by keeping the amount of slurry constant by continuously removing the liquid component of the nickel composite hydroxide slurry that was obtained in the primary crystallization process, and controlling the temperature of the slurry so as to be 70° C. to 90° C., and the pH value at a liquid temperature of 25° C., or in other words, the pH value at a standard liquid temperature of 25° C., to be 10.0 to 11.0. As a result, it is possible to obtain fine primary particles without using a complex ion formation agent, and it further becomes possible to control the particle size distribution of secondary particles, which are an aggregate of the fine primary particles, to be within a specified range. Each process will be explained in detail below.

(a) Primary Crystallization Process

The primary crystallization process is a process of obtaining a nickel composite hydroxide slurry by continuously supplying an aqueous solution, which includes at least a nickel salt, and a neutralizer to a reaction vessel while stirring in a state in which a complex ion formation agent that forms complex ions with metal elements is not included in the reaction aqueous solution.

In this process, it is necessary to perform control so that the ratio of the volume-average particle size (MV) of the secondary particles of the nickel composite hydroxide that is generated in the nickel composite hydroxide slurry with respect to the volume-average particle size (MV) of the secondary particles of the nickel composite hydroxide that are finally obtained in the secondary crystallization process (hereafter, this will be referred to as the "volume-average particle size ratio") is 0.2 to 0.6, more preferably 0.25 to 0.6, and even more preferably 0.3 to 0.6.

More specifically, when the volume-average particle size (MV) of the secondary particles of the nickel composite hydroxide that are finally obtained in the secondary crystallization process is regulated to be within the range 8.0 μm to 50.0 μm, it is necessary to perform control so that the volume-average particle size (MV) of secondary particles that are generated in the primary crystallization is within the range 1.6 μm to 25 μm, more preferably 1.6 μm to 20 μm, even more preferably 2 μm to 18 μm, and further even more preferably 2.5 μm to 15 μm.

By controlling the volume-average particle size ratio to be within the range above, it is possible to grow secondary particles in the secondary crystallization process without generating fine particles, so it becomes possible to obtain a nickel composite hydroxide that has a uniform particle size and that has a good particle size distribution, or in other words, a sharp particle size distribution.

When the volume-average particle size ratio is less than 0.2, and the target volume-average particle size (MV) of the secondary particles is 20.0 μm, the volume-average particle size (MV) of the secondary particles generated in the primary crystallization process is only about 4.0 μm. Therefore, in order to grow the secondary particles to the target particle size, it is necessary in the secondary crystallization process for the slurry concentration of the nickel composite hydroxide in the reaction vessel (number of particles with respect to the amount of liquid component) to become a very high concentration. As a result, uniform stirring becomes difficult due to the increased viscosity of the slurry, so it becomes very difficult to generate particles having a uniform particle size. Moreover, in order to stir this kind of highly viscous slurry, it is necessary to increase the power of the mixer, which is disadvantageous in industrial production. In addition, the growth rate from the particle size of the secondary particles that were generated in the primary crystallization process to the target particle size is large, so the chance for nucleation during growth increases, and thus fine particles increase.

On the other hand, when the volume-average particle size ratio exceeds 0.6, the number of particles per volume that are generated inside the reaction vessel decreases, and the growth reaction areas decrease. Therefore, in the primary crystallization process and the secondary crystallization process, fine particles are generated during particle growth and it is difficult to make the particle size uniform. Moreover, the raw material that is supplied in the secondary crystallization process decreases, so productivity decreases.

In order to achieve a high level of productivity, preferably the number of particles per volume of solvent generated in the primary crystallization process is increased, or in other words, preferably the slurry concentration is increased within a stirrable range. More specifically, preferably the slurry concentration is controlled so that the number of moles of nickel composite hydroxide that is generated is within the range 1 mol/L to 2 mol/L. When the slurry concentration is less than 1 mol/L, the number of particles generated per volume decreases, and the growth reaction areas decrease, so it becomes easy for fine particle to be generated. On the other hand, when the slurry concentration exceeds 2 mol/L, uniform stirring may become difficult due to an increase in viscosity. In order to control the slurry concentration so as to be within this kind of range, preferably the amount of solvent for which the pH value was adjusted and that was placed inside the reaction vessel beforehand is reduced to a range so that stirring is possible.

Moreover, in order to generate secondary particles for which the volume-average particle size ratio is 0.2 to 0.6 in a state that does not include a complex ion formation agent, it is necessary to adequately control the particle size of the secondary particles by the crystallization conditions such as the pH value, slurry temperature and the like. For example, when the pH value at a standard liquid temperature of 25° C. is controlled to be within the range 10.0 to 11.0, and preferably 10.2 to 10.8, the slurry temperature is controlled to be within the range 40° C. to 70° C. Alternatively, when the slurry temperature is controlled to be within the range 70° C. to 90° C., and preferably 70° C. to 80° C., the pH value at a standard liquid temperature of 25° C. is controlled to be within a range of 10.0 to 13.0, and preferably 10.0 to 12.5, and more preferably 10.0 to 11.0. By controlling crystallization conditions such as these, it is possible to obtain secondary particles that are composed of fine primary particles and that have a large particle size while at the same time suppress nucleation. Moreover, it is possible to form the primary particles into a fine needle shape and/or plate shape, and form the secondary particles into a spherical shape composed of an aggregate of the primary particles.

In the stage of the primary crystallization process, when the volume-average particle size ratio is within the range above, there is no problem even when the particle size distribution of the particles is large. This is because in the secondary crystallization process, the number of particles is fixed and there is no fluctuation in the growth reaction areas, so the raw material that is supplied is consumed by particle growth, and the difference in particle size between particles becomes small.

For example, the case will be considered in which when the volume-average particle size ratio is 0.5, the secondary particles A (particle size: a) at the end of the primary crystallization process grow in the secondary crystallization process to become secondary particles B (particle size: b) having the target volume-average particle size (MC). Here, the volume $V_A$ of the secondary particles A is taken to be a reference ($V_A=(4/3) \cdot \pi \cdot a^3$). The particle size b of the secondary particles B becomes double the particle size a of the secondary particles A, so (a/13=0.5, and b=2a), and the volume $V_B$ of the secondary particles B, with the volume $V_A$ of the secondary particles A as a reference, becomes $8V_A$ ($V_B=(4/3) \cdot \pi \cdot b^3=(4/3) \cdot \pi \cdot (2a)^3=8 \cdot (4/3) \cdot \pi \cdot a^3=8V_A$). In other words, an amount of material corresponding to 7 times the volume of secondary particles A is consumed in the growth from secondary particles A to secondary particles B.

On the other hand, the case will be considered in which secondary particles C (particle size: c) for which the volume-average particle size ratio is 0.33 are mixed into the secondary particles A and grown by the same amount of material. When doing this, the particle size of the secondary particles C at the end of the primary crystallization process becomes 0.66 times that of the secondary particles A, so (c/b=c/2a=0.33, and c=0.66a), and with the secondary particles A as a reference, the volume $V_C$ of the secondary particles C becomes approximately $0.3V_A$ ($V_C=(4/3) \cdot \pi \cdot c^3=(4/3) \cdot \pi \cdot (0.66a)^3 \approx 0.3 \cdot (4/3) \cdot \pi \cdot a^3 = 3V_A$). When the secondary particles C are grown with the same amount of material as the secondary particles A, the volume $V_D$ of the secondary particles D after growth, with the secondary particles A as a reference, becomes $7.3V_A$. In other words, the particle size d of the secondary particle D that were grown to the final particle size becomes 1.94 times the particle size a of the secondary particles A ($V_D/V_A=(7V_A+0.3V_A)/V_A=7.3=d^3/a^3$, and d=1.94a), and secondary particles D having a particle size d that is 97% the particle size b of the secondary particles B are obtained (d/b=1.94/2=0.97). Therefore, even when secondary particles C having a particle size c that is 66% the particle seize a of the secondary particles A before growth are mixed in, the particles grow to secondary particles D having a particle size d that is 97% the particle size b of the secondary particles B after growth, and the relative difference in particle size after growth is greatly reduced when compared with that before growth, so it can be seen that the particle size distribution is also greatly improved.

A specific trial calculation will be performed for the case in which secondary particles having a small particles size, such as the secondary particles C above (secondary particles having a particle size that is 66% that of the secondary particles A) are mixed in. For example, when the target volume-average particle size (MV) is taken to be 30 μm, and the target volume-average particle size ratio is taken to be 0.3, the particle size of the secondary particles A at the end of the primary crystallization process is 9 μm, and the particle size of the secondary particles C having a small particles size that are mixed in during the primary crystallization process is 5.9 μm. Therefore, the particle size of the secondary particles B at the end of the secondary crystallization process is 30 μm, and the particle size of the secondary particles D is 29.1 μm. Moreover, when the target volume-average particle size (MV) is taken to be 10 μm, and the target volume-average particle size ratio is taken to be 0.5, the particle size of the secondary particles A at the end of the primary crystallization process is 5 μm, the particle size of the secondary particles C is 3.3 μm, the particle size of the secondary particles B at the end of the secondary crystallization process is 10 μm, and the particle size of the secondary particles D is 9.7 μm.

Therefore, in the primary crystallization process, it is sufficient to perform control of only the volume-average particle size (MV) of the secondary particles of nickel composite hydroxide that were generated in the slurry so as to be within a specified range, and it is not necessary to take into consideration the particle size distribution itself of the secondary particles that are generated.

The primary crystallization process ends at the instant when the reaction vessel becomes full by supplying the aqueous solution, which includes at least a nickel salt, and a neutralizer. In other words, the reaction of the primary crystallization process is preferably controlled so that at that instant, the volume-average particle size (MV) of the generated secondary particles reaches 0.2 to 0.6 that of the target volume-average particle size (MV) of secondary particles.

(b) Secondary Crystallization Process

The secondary crystallization process is a process for continuing crystallization by maintaining the state that does not include a complex ion formation agent, and performing control so that the slurry temperature is within the range 70° C. to 90° C., and the pH value at a standard liquid temperature of 25° C. is within the range 10.0 to 11.0 while continuously keeping the amount of slurry constant by removing the liquid component of the nickel composite hydroxide that was obtained in the primary crystallization process. In this kind of secondary crystallization process, a method is also feasible in which the liquid component is intermittently removed. However, in intermittent removal the number of particles per volume of solvent fluctuates and the growth reaction areas are not stable, so it becomes difficult to stabilize particle growth.

In this kind of secondary crystallization process, together with being able to increase productivity by concentrating the slurry, it is possible to produce secondary particles of nickel composite hydroxide while keeping the particle size uniform and suppressing the occurrence of fine particles during particle growth. Moreover, the number of particles per volume of slurry is kept constant, so it becomes possible to stably grow the secondary particles of nickel composite hydroxide.

The crystallization conditions in the secondary crystallization process, in the case when control is performed in the primary crystallization process so that the slurry temperature is within the range 70° C. to 90° C., and the pH value at a standard liquid temperature of 25° C. is within the range 10.0 to 11.0 for example, should be kept at those conditions. However, in the primary crystallization process, when the slurry temperature is within the range 40° C. to 70° C. and control is performed so that the pH value at a standard liquid temperature of 25° C. is within the range 10.0 to 11.0, it is necessary to manipulate the crystallization conditions so that slurry temperature is within the range 70° C. to 90° C. while maintaining the pH value. Moreover, in the primary crystallization process, when the slurry temperature is within the range 70° C. to 90° C. and control is performed so that the pH value at a standard liquid temperature of 25° C. is within the range 10.0 to 13.0, it is necessary to manipulate the crystallization conditions so that the pH value is within the range 10.0 to 11.0 while maintaining the slurry temperature. By manipulating the crystallization conditions, it becomes possible to grow secondary particles having a large particle size while controlling nucleation even in the secondary crystallization process.

In the secondary crystallization process, it is necessary to continue crystallization until the volume-average particle size (MV) of the obtained secondary particles becomes 8.0 μm to 50.0 μm, preferably 9.0 μm to 50.0 μm, more preferably 18.0 μm to 50.0 μm, and even more preferably 18.0 μm to 40.0 μm. When the volume-average particle size (MV) is less than 8.0 μm, the number of particles becomes too large, uniform stirring becomes difficult and obtaining a uniform reaction also becomes difficult, so it becomes easy for fine particles to occur. Moreover, the packing density of the cathode active material that is obtained with the nickel composite hydroxide as a precursor is not sufficient. On the other hand, when the volume-average particle size (MV) exceeds 50.0 μm, fine particles occur in the process of growing the secondary particles to the target particle size, so a uniform particle size cannot be obtained. Moreover, when producing an electrode using the cathode active material that is obtained with the nickel composite hydroxide as a precursor, clogging of the filter when filtering the cathode mixture paste occurs, and defects such as a long thin shape during coating occur, which are also not preferable.

The production method of the present invention, as described above, together with being able to increase productivity by concentrating the slurry, is able to produce secondary particles of nickel composite hydroxide while keeping the particle size uniform and suppressing the occurrence of fine particles during particle growth. Therefore, this method is particularly suitable for producing a nickel composite hydroxide that is composed of secondary particles having low productivity and a volume-average particle size (MV) of 18.0 μm or more in which it is easy for fine particles to become mixed in.

As the method for removing the liquid component, it is possible to use a typical solid-liquid separation method such as a cross-flow filtration unit, a dead-end filtration unit, sedimentation separation and the like. In whichever method is used, it is necessary to sufficiently reduce the number of particles included in the filtrate. If particles are discharged to the filtrate side, not only is productivity decreased, but the reaction areas for particle growth are also decreased. As a result, nucleation eventually occurs, and the number of particles in the reaction system greatly increases. When the number of particles in the reaction system increases, the amount of material that is used in the growth per one secondary particle of nickel composite hydroxide decreases, so the speed of growth of the secondary particles is reduced, and unless the slurry is concentrated to a very high slurry concentration, it will not be possible to grow the secondary particles to the target particle size. Moreover, particles that occurred due to nucleation in the secondary crystallization process have a short growth time, so the particle size of those particles is a smaller particle size than the particles that existed from the beginning of the secondary crystallization process. Therefore, the particle size distribution may also become bad.

Of the removal methods above, a method using a cross-flow filtration unit is preferred. In the cross-flow filtration unit, the flow of slurry and filtrate are in orthogonal directions, and particles that would clog the filter are carried away by the flow of the slurry, so it becomes more difficult for the filter to become clogged, and thus it is possible to perform concentration continuously and stably. Using a ceramic filter for this filter is preferred. This is because a ceramic filter has higher pressure resistance and chemical resistance compared to the polymer filter, and therefore increasing processing performance in high-pressure operation and facilitating acid cleaning when blockage occurs.

The material of the ceramic filter is not particularly limited, however, it is possible to use, for example, α alumina (α-$Al_2O_3$), zirconium oxide ($ZrO_2$), titanium oxide ($TiO_2$) or the like. Moreover, preferably the pore size of the ceramic filter is 0.01 μm to 0.5 μm.

In regards to this, a dead-end filtration unit is disadvantageous in that, in order to prevent the filter from becoming clogged, it is necessary to perform periodic cleaning, and due to maintenance of the apparatus, it is difficult to continuously perform crystallization. In the case of sedimentation separation, the speed of sedimentation changes as the particle size inside the reaction system changes, so control becomes complicated. There is also a disadvantage in that sedimentation requires time, so the size of the apparatus must be increased in the case of continuous processing.

The crystallization conditions in the production method of the present invention will be explained in more detail below.
(Raw Material Aqueous Solution)

An aqueous solution that includes at least a nickel salt is used as the raw material aqueous solution. As the nickel salt, it is possible to use nickel sulfate, nickel nitrate, nickel chloride and the like. Moreover, in the case of adding a metal other than nickel, a sulfate, nitrate or chloride of that metal can also be used.

Preferably, an aqueous solution is used so that the total salt concentration of all salts included in the raw material aqueous solution is 1.0 mol/L to 2.2 mol/L. When the salt concentration is less than 1.0 mol/L, the crystals of the nickel composite hydroxide may not grow sufficiently. Moreover, in the primary crystallization process, the slurry concentration decreases, so high productivity cannot be obtained. In order to increase productivity, the salt concentration is preferably 1.5 mol/L or more. On the other hand, when the salt concentration exceeds 2.2 mol/L, the concentration exceeds the saturated concentration at normal temperature, so in addition to there being a danger that crystals will precipitate again and clog the piping, the chance of nucleation increases and the number of fine particles increases.
(pH Value Control)

In the primary crystallization process, when the slurry temperature is controlled to be within the range 40° C. to 70° C., in the secondary crystallization process, it is necessary to perform control so that the pH value at a standard liquid temperature of 25° C. is 10.0 to 11.0, and preferably 10.2 to 10.8. When the pH value is less than 10.0, anions that are included in the metal salt easily become incorporated into the nickel composite hydroxide and become an impurity. Moreover, in the primary crystallization process, fine needle shaped and/or plate shaped primary particles are not generated, and the secondary particles are formed from large primary particles. Furthermore, in the secondary crystallization process, the shape of the secondary particles easily become an irregular shape, and as a result, nickel composite hydroxide that is composed of secondary particles having a very large particle size distribution is formed. On the other hand, when the pH value exceeds 11.0, then as in the case when the slurry temperature is low, the solubility of the metal salt becomes low, so nucleation easily occurs and a large amount of fine particles are generated. Therefore, in the primary crystallization process, the volume-average particle size (MV) of the secondary particles is not within a suitable range. Moreover, in the secondary crystallization process, nickel composite hydroxide that is composed of secondary particles having a large particle size distribution is formed.

In the primary crystallization process, when the slurry temperature is controlled so as to be in the range 70° C. to 90° C., the slurry pH value can be in a wide range of 10.0 to 13.0.

(Reaction Temperature)

In the primary crystallization process, when the pH value at a standard liquid temperature of 25° C. is controlled to be within the range 10.0 to 13.0, in the secondary crystallization process, it is necessary to perform control so that the slurry temperature is within the range 70° C. to 90° C., preferably within the range 70° C. to 80° C., and more preferably within the range 70° C. to 75° C. When the slurry temperature is less than 70° C., the solubility of the metal salts such as nickel is low, it becomes easy for nucleation to occur and a large amount of fine particles are generated, so in the primary crystallization process, the volume-average particle size (MV) of secondary particles is not within a suitable range. Moreover, in the secondary crystallization process, nickel composite hydroxide that is composed of secondary particles having a wide particle size distribution is formed. On the other hand, when the slurry temperature exceeds 90° C., the evaporation of water becomes intense, and it also becomes easy for localized bumping to occur, so it become difficult to control the reaction system.

In the primary crystallization process, when the pH value at a standard liquid temperature of 25° C. is controlled to be within the range 10.0 to 11.0, it is possible to control the slurry temperature to be within the range 40° C. to 70° C.

(Neutralizer)

The pH value can be controlled by adding an alkali solution as a neutralizer. The alkali solution is not particularly limited, and for example, it is possible to use a typical alkali metal hydroxide aqueous solution such as sodium hydroxide, potassium hydroxide and the like. The alkali metal hydroxide can be directly added to the mixed aqueous solution, however, from the aspect of the ease of pH control, it is preferably added as an aqueous solution. In that case, the concentration of the alkali metal hydroxide aqueous solution should be in the range 12.5% to 30% by mass, and preferably in the range 20% to 30% by mass. When the concentration of alkali metal hydroxide aqueous solution is less then 12.5% by mass, the slurry concentration in the primary crystallization process decreases and productivity may become bad. On the other hand, when the concentration is greater then 30% by mass, the pH value at the area where the alkali aqueous solution is added becomes locally high, and fine particles may be generated.

The method for adding the alkali aqueous solution is not particularly limited, however, preferably is added by a flow controllable pump such as a constant-volume pump while sufficiently stirring the reaction aqueous solution.

(Stirring Conditions)

The stirring conditions in the primary crystallization process and secondary crystallization process are not particularly limited as long as the slurry that is obtained in these processes can be uniformly stirred, and these conditions can be appropriately adjusted according to the slurry concentration, the reaction vessel that is used, the paddle size and shape, and the like. For example, when the slurry concentration is controlled to be within the range 1 mol/L to 2 mol/L as described above, and a 2 L to 10,000 L reaction vessel, a paddle having a 30 mm to 1,000 mm diameter, 2 to 8 blades, and inclination angle of 20° to 80° are used, preferably the stirring rotational speed (rpm) of that paddle is controlled to be within the range 50 rpm to 1400 rpm, and more preferably is controlled to be within the range 100 rpm to 1,000 rpm. When the stirring rotational speed of the paddle is less than 50 rpm, it is difficult to obtain uniform stirring. Moreover, aggregation of particles may increase, causing the particle size distribution to worsen. On the other hand, when the stirring rotational speed is greater than 1400 rpm, secondary particles that were generated in the crystallization process will collide with each other, and there is a possibility that secondary particles having the desired shape and size will not be obtained.

(Reaction Time)

The reaction time in the primary crystallization process and the secondary crystallization process is not particularly limited as long as the volume-average particle size ratio and volume-average particle size (MV) of the nickel composite hydroxide are controlled so as to be within in the ranges above; however, preferably the reaction time is appropriately adjusted taking into consideration the size of the reaction vessel used and after performing a preliminary test. For example, when the crystallization processes are performed under the crystallization conditions described above, preferably the reaction time for the primary crystallization process is set to 0.5 to 10 hours, and more preferably, 1 to 8 hours, and the reaction time for the secondary crystallization process is set to 2 to 150 hours, and more preferably, 4 to 120 hours. By setting the reaction times to these ranges, it is possible to easily produce a nickel composite hydroxide having a uniform particle size and high packing density without impeding productivity.

(1-2) Nickel Composite Hydroxide

The nickel composite hydroxide of the present invention is composed of spherical secondary particles that are formed by a plurality of primary particles. The length in the short-diameter direction of the primary particles is 1 μm or less, the volume-average particle size (MV) of the secondary particles is 8.0 μm to 50.0 μm, and (D90−D10)/MV which indicates the relationship of the particle size distribution to the volume-average particle size (MV) is less than 0.5.

These features of the nickel composite hydroxide of the present invention are achieved by controlling the crystallization conditions in the primary crystallization process and secondary crystallization process so as to be within the ranges above without using a complex ion formation agent.

(Particle Structure)

The nickel composite hydroxide of the present invention is composed of spherical-shaped secondary particles. More specifically, the spherical secondary particles are formed by an aggregation of a plurality of needle-shaped and/or plate-shaped primary particles. This is because by the needle-shaped and/or plate shaped primary particles aggregating together in random directions, uniform spaces occur between the primary particles, and when mixed with a lithium compound and calcination is performed, the molten lithium compound moves inside the secondary particles, and spreading of lithium is sufficiently performed.

(Length in Short-Diameter Direction of Primary Particles)

The length in the short-diameter direction of the primary particles is 0.1 μm or less, and preferably no less than 0.01

μm and no greater than 0.06 μm. As a result, when cathode active material, which has the nickel composite hydroxide of the present invention as a precursor, is obtained, it is possible to maintain sufficient contact surface area between the cathode active material and the electrolyte. This is because the particle properties of the cathode active material take on the particle properties of that nickel composite hydroxide precursor, so by controlling the length in the short-diameter direction of the primary particles of the nickel composite hydroxide, it is possible to increase the particle boundaries of the primary particles and to increase the number of minute spaces that are formed inside the cathode active material. As a result, it is possible to increase the capacity and output of a secondary battery that uses the cathode active material that is obtained with the nickel composite hydroxide of the present invention as a precursor.

When cathode active material is obtained using the nickel composite hydroxide precursor composed of the primary particles of which the length in the short-diameter direction is greater than 0.1 μm, it becomes impossible to maintain sufficient contact surface area between the cathode active material and the electrolyte.

(Volume-Average Particle Size of Secondary Particles)

The volume-average particle size (MV) of secondary particles is 8.0 μm to 50.0 μm, and preferably 9.0 μm to 50.0 μm. As a result, when a cathode active material is obtained with the nickel composite hydroxide of the present invention as a precursor, it is possible to increase the packing density of the cathode active material. When the volume-average particle size (MV) is less than 8.0 μm, space between particles increases and it is not possible to increase the packing density of the cathode active material that is obtained. On the other hand, when the volume-average particle size is greater than 50.0 μm, the cathode active material that is obtained easily clogs the filter when filtering the cathode paste in the process of producing a cathode, and it becomes easy for long thin defects to occur during coating of the cathode paste.

In order to further increase the packing density of the cathode active material, the volume-average particle size (MV) is more preferably 18.0 μm to 50 μm, and even more preferably 20.0 μm to 40.0 μm.

(Particle Size Distribution)

By making (D90−D10)/MV, which indicates the relationship of the particle size distribution on a volume basis (volume distribution) to the volume-average particle size (MV), less than 0.5, and preferably in the range of less than 0.5 but no less than 0.3, and more preferably no less than 0.35 and no greater than 0.48, it becomes possible to reduce the fine particles that are included in the lithium nickel composite oxide that is obtained. As a result, when a secondary battery is made using a cathode active material that is obtained with this nickel composite hydroxide as a precursor, it is possible to suppress a drop in the battery characteristics such as thermal stability and cycling characteristic due to selective degradation of fine particles. When (D90−D10)/MV is greater than 0.5, not only do the battery characteristics drop, but the amount of rough particles increases and it becomes easy for clogging of the filter to occur or for long thin shaped defects to occur when coating the slurry, and it is not possible to obtain a cathode active material that is suitable for a non-aqueous electrolyte secondary battery.

(Composition)

The nickel composite hydroxide of the present invention preferably has a composition that is expressed by the general expression: $Ni_{1-x-y}Co_xM_y(OH)_{2+A}$ (where $0 \leq x \leq 0.35$, $0 \leq y \leq 0.35$, $0 \leq A \leq 0.5$, and M is at least one kind of additional element selected from Mn, V, Mg, Al, Ti, Mo, Nb, Zr and W). With this composition, when a cathode active material for a non-aqueous electrolyte secondary battery that is obtained with this nickel composite hydroxide as a precursor is used as the cathode material, it is possible to obtain excellent battery characteristics.

In the nickel composite hydroxide of the present invention, the value of x that indicates the atomic ratio of cobalt (Co) is preferably 0.35 or less, and more preferably 0.22 or less. In the present invention, when a lithium nickel composite oxide that is obtained with the nickel composite hydroxide as a precursor is used as the cathode active material for a non-aqueous electrolyte secondary battery, replacing part of the nickel (Ni) of this crystal lattice with cobalt causes the expansion behavior and shrinkage behavior of the crystal lattice due to the insertion and deinsertion of lithium during discharging and charging to decrease, which improves the cycling characteristic, however, when the value of x is greater than 0.35, such an effect cannot be obtained.

The value of y that indicates the atomic ratio of additional elements M is preferably 0.35 or less, and more preferably 0.15 or less. By using only a small amount in the case of a lithium nickel composite oxide, the additional elements M make it possible to improve the durability characteristic and output characteristics of a battery. When the value of y is greater than 0.35, the metal elements that contribute to the Redox reaction of the cathode active material are decreased, and the battery capacity drops.

Moreover, when the total amount of cobalt and additional elements M added is too large, the capacity of a battery that uses the obtained lithium nickel composite oxide decreases. Therefore, the value x+y that indicates the total amount of cobalt and additional elements added is preferably less than 0.3, and more preferably 0.2 or less.

The amount (atomic ratio) of cobalt and additional elements M that are added coincides with the composition ratio of the raw material aqueous solution that is used in the primary and secondary crystallization processes for the nickel composite hydroxide. Therefore, in order to obtain a nickel composite hydroxide having the composition ratio that is expressed in the general expression, the raw material aqueous solution that has been adjusted so that the composition ratio is that of the general expression should be supplied and co-precipitated. As such a method, it is possible to supply the raw material aqueous solution in a mixed aqueous solution in which metal salts are mixed in, or by individually supplying each metal element aqueous solution.

(Additional Elements)

As additional elements M, it is possible to use at least one element selected from manganese (Mn), vanadium (V), magnesium (Mg), aluminum (Al), titanium (Ti), molybdenum (Mo), niobium (Nb), zirconium (Zr) and tungsten (W).

Additional elements M such as these can be included in the nickel composite hydroxide in the crystallization process described above by dissolving the elements in the raw material aqueous solution together with nickel and cobalt, and causing the elements to crystallize. However, preferably the additional elements M are exposed on the surface of the nickel composite hydroxide that is obtained by the crystallization process. More specifically, it is possible to uniformly expose the additional elements M on that surface by creating a slurry of nickel composite hydroxide with the aqueous solution that includes the additional elements M, and adding aqueous solution that includes the at least one additional element M while performing control so that the pH value becomes a specified value, then precipitating the at least one additional element M onto the surface of secondary particles of the nickel composite hydroxide in the crystallization reaction. In this case, a good effect can be obtained even when only a small amount of additional elements M are added.

The supply source of the additional elements M is not particularly limited as long as it is water-soluble compound; for example, titanium sulfate, peroxotitanic acid ammonium, titanium potassium oxalate, vanadium sulfate, ammonium vanadate, zirconium sulfate, zirconium nitrate, niobium oxalate, ammonium molybdate, sodium tungstate, ammonium tungstate, and the like can be used.

(2-1) Production Method for Cathode Active Material for Non-Aqueous Electrolyte Secondary Battery In the following, a method for producing a cathode active material for a non-aqueous electrolyte secondary battery that uses the nickel composite hydroxide as a precursor will be explained. This production method includes a mixing process of forming a lithium mixture by mixing the nickel composite hydroxide with a lithium compound, and a calcination process of performing calcination of the lithium mixture in an oxidizing atmosphere at a temperature of 650° C. to 950° C.

(a) Mixing Process

The lithium compound is not particularly limited, however, lithium hydroxide, lithium nitrate, lithium carbonate, or a mixture of these can be easily obtained, so are preferred. Particularly, when considering the easy of handling and the product stability, the use of lithium hydroxide or lithium carbonate is preferred.

Nickel composite hydroxide and lithium compound are mixed so that the ratio (Li/Me) of the number of atoms of metal other than lithium in the lithium mixture, or in other words, the total number of atoms (Me) of nickel, cobalt and additional elements M, and the number of atoms of lithium (Li) is 0.95 to 1.50, and preferably 0.95 to 1.20. Particularly, when the value x+y above is less than 0.3, preferably the nickel composite hydroxide and lithium compound are mixed so that Li/Me is 0.98 to 1.10. In other words, the ratio Li/Me does not change before or after calcination, so it is necessary that Li/Me of the lithium mixture that is obtained by this mixing process be the same as Li/Me of the cathode active material to be obtained.

A typical mixer is used for mixing; for example a shaker mixer, a Loedige mixer, a Julia mixer, a V blender and the like can be used, and mixing should be performed sufficiently without destroying the structure of the nickel composite hydroxide.

(b) Roasting Process

Before the mixing process, preferably there is also a roasting process of roasting the nickel composite hydroxide beforehand in an oxidizing atmosphere at a temperature of 300° C. to 1,000° C.

With this kind of roasting process, it is possible to change the nickel composite hydroxide to a nickel composite oxide, and when that nickel composite oxide is mixed with the lithium compound, it is possible to stabilize the composition ratio of the lithium and metal elements in the lithium nickel composite oxide while maintaining the packing density of the lithium nickel composite oxide.

The roasting temperature is preferably 300° C. to 1,000° C., and more preferably 400° C. to 800° C. When the roasting temperature is less than 300° C., there is a possibility that part of the nickel composite hydroxide will remain and that the composition will not be stable. On the other hand, when the roasting temperature is greater than 1,000° C., sintering between particles occurs and rough particles are generated, so the particle size distribution worsens. The roasting time is not particularly limited as long as it is possible to sufficiently convert the nickel composite hydroxide to nickel composite oxide, and preferably is suitably controlled according to the performance of the roasting furnace and the surrounding conditions.

(c) Calcination Process

The calcination process is a process for forming a lithium nickel composite oxide by calcining the lithium mixture that was obtained in the mixing process. The calcination process is preferably performed in an oxidizing atmosphere at 650° C. to 950° C., and more preferably 700° C. to 900° C. When the calcination temperature is less than 650° C., spreading of lithium does not advance sufficiently, and surplus lithium remains, resulting in an incomplete crystal structure, so sufficient characteristics are not obtained for use in a battery. On the other hand, when the calcination temperature is greater than 950° C., there is a possibility that together with severe sintering occurring, there will be abnormal particle growth, so there is a possibility that the particles after calcination will become rough and that a spherical particle shape will not be maintained. The specific surface area of this kind of cathode active material decreases, so when used in a secondary battery, there is a problem in that the cathode resistance increases and the battery capacity decreases.

When the ratio of the total number of atoms of cobalt and additional elements M (value of x+y in the general expression) with respect to the number of atoms of all of the metal elements in the nickel composite hydroxide is less than 0.3, performing calcination at a temperature of 650° C. to 800° C. is more preferred.

Moreover, from the aspect of uniformly performing the reaction between the nickel composite hydroxide or nickel composite oxide with the lithium compound, preferably the temperature rises to the temperature above at a rate of temperature rise of 1° C./min to 5° C./min. Furthermore, it is possible to perform the reaction even more uniformly by maintaining the temperature at near the melting point of the lithium compound for 1 hour to 10 hours.

(2-2) Cathode Active Material for Non-Aqueous Electrolyte Secondary Battery

A feature of the cathode active material for a non-aqueous electrolyte secondary battery of the present invention is that the volume-average particle size (MV) is 8.0 µm to 50.0 µm, and preferably 9.0 µm to 50.0 µm, and (D90−D10)/MV that indicates the relationship of the particle size distribution to the volume-average particle size (MV) is less than 0.5, preferably is less than 0.5 but no less than 0.3, and more preferably is no less than 0.35 and no greater than 0.48. Moreover, another feature is that the cathode active material is made from a layered hexagonal crystal lithium nickel composite oxide having a crystallite diameter found using the Scherrer equation from the (003) plane peak in X-ray diffraction that is 30 nm to 150 nm.

(Volume-Average Particle Size and Particle Size Distribution)

The cathode active material of the present invention has a volume-average particle size (MV) that is in the range 8.0 µm to 50.0 µm, and preferably 9.0 µm to 50.0 µm. Moreover, (D90−D10)/MV that indicates the relationship of the particle size distribution to the volume-average particle size (MV) is less than 0.5, and preferably is in the range of less than 0.5 but no less than 0.3, and more preferably is in the range of no less than 0.35 and no greater than 0.48. The cathode active material of the present invention has a sharp particle size distribution such as this and a high packing density, so it is possible to increase the battery capacity and output, and improve the cycling characteristic, and can be suitably used as the cathode material for a non-aqueous electrolyte secondary battery. In order to further increase the packing density, a volume-average particle size (MV) of 18.0 μm to 50.0 μm is more preferred, and 20.0 μm to 40.0 μm is even more preferred.

(Crystallite Diameter)

In the present invention, a complex ion formation agent is not used, so it is possible to make the crystallite diameter that is found using the Scherrer equation from the (003) plane peak in X-ray diffraction to be 30 nm to 150 nm, and preferably 50 nm to 120 nm. Here, the crystallite diameter D (Å) that is found using the Scherrer equation is a value that is found from $D=K\cdot\lambda/((\beta \times \cos \theta)$ where the Scherrer constant is K, the wavelength of the X-ray tube bulb used is $\lambda$, the spread of the diffraction line according to the size of the crystallite is $\beta$ and the diffraction angle is $2\theta$.

By controlling the value of the crystallite diameter of the lithium nickel composite oxide of the cathode active material so as to be the value above, the particle boundaries of primary particles increase, as well as the fine spaces between secondary particles increase, so it is possible to maintain sufficient contact surface area between the cathode active material and the electrolyte. As a result, when a non-aqueous electrolyte secondary battery is formed with the cathode active material of the present invention used as the cathode material, it is possible to increase the capacity and output of the non-aqueous electrolyte secondary battery.

When the crystallite diameter is less than 30 nm, the contact surface area with the electrolyte becomes too large, so thermal stability decreases. On the other hand, when the crystallite diameter is greater than 150 nm, the contact surface area with the electrolyte becomes small, so the output characteristic of the battery worsens.

(Crystal Structure)

The cathode active material for a non-aqueous electrolyte secondary battery of the present invention is composed of a layered hexagonal crystal lithium nickel composite oxide, where part of the nickel (Ni) of the crystal lattice is replaced with cobalt (Co), so expansion and shrinkage behavior of the crystal lattice due to insertion and deinsertion of lithium during discharging and charging is decreased, and it is possible to improve the cycling characteristic.

(Composition)

The composition of the cathode active material for a non-aqueous electrolyte secondary battery of the present invention is preferably expressed by the general expression: $Li_{1+u}Ni_{1-x-y}Co_xM_yO_2$ (where $-0.05 \leq u \leq 0.50$, $0 \leq x \leq 0.35$, $0 \leq y \leq 0.35$, and M is at least one additional element that is selected from Mn, V, Mg, Al, Ti, Mo, Nb, Zr and W).

The value u that indicates the excess amount of lithium is preferably −0.05 to 0.50. When the value of u is less than −0.05, the reaction resistance of the cathode in a non-aqueous electrolyte secondary battery that uses the obtained cathode active material becomes large, so the battery output becomes low. On the other hand, when the value of u is greater than 0.50, the initial electric discharge capacity when the cathode active material is used in the cathode of a battery decreases, and the reaction resistance of the cathode also increases. When the value of x+y, which is the total amount of cobalt and additional elements M that are added, is less than 0.3, the value of u that indicates the excess lithium is preferably 0.2 or less in order to suppress a decrease in battery capacity.

The composition ratios of metal elements other than lithium are kept the same as in the composition of the nickel composite oxide.

(3) Non-Aqueous Electrolyte Secondary Battery

The non-aqueous electrolyte secondary battery of the present invention uses the cathode active material for a non-aqueous electrolyte secondary battery above as the cathode material, and the construction of the non-aqueous electrolyte secondary battery of the present invention is explained below. The embodiment explained below is not limited to this example, and non-aqueous electrolyte secondary battery of the present invention can also be embodied by undergoing various changes and/or improvements based on the embodiment disclosed in this specification and based on the knowledge of one skilled in the art. The explanation below does not particularly limit the application of the non-aqueous electrolyte secondary battery of the present invention.

Except for using the cathode active material of the present invention as the cathode material, the non-aqueous electrolyte secondary battery of the present invention has essentially the same construction as a typical non-aqueous electrolyte secondary battery. For example, it is possible to apply the present invention to a secondary battery having construction that has a case, and a cathode, an anode, a non-aqueous electrolyte and a separator that are housed inside the case. More specifically, this kind of secondary battery is formed by layering a cathode and anode by way of a separator to form an electrode body, impregnating the obtained electrode body with a non-aqueous electrolyte, using collector leads to connect between a cathode collector of the cathode and a cathode terminal that leads to the outside, and between an anode collector of the anode and an anode terminal that leads to the outside, then sealing the case.

(Cathode)

Cathode paste that becomes the base of the cathode is obtained by mixing a powdered cathode active material, a conductive material, and a binding agent, then as necessary, adding activated carbon and a solvent for viscosity control, and kneading these together.

The mixture ratios in the cathode paste are important elements for determining the performance of the non-aqueous electrolyte secondary battery. For example, when the total mass of the solid content of cathode mixture except for the solvent is taken to be 100 parts by mass, then preferably, as in a typical cathode of a non-aqueous electrolyte secondary battery, the content of the cathode active material, which is the cathode material, is 60 to 95 parts by mass, the content of the conductive material is 1 to 20 parts by mass, and the content of the binding agent is 1 to 20 parts by mass.

This cathode paste, for example, is coated on the surface of an aluminum foil collector, then dried to cause the solvent to disperse. As necessary, pressure may be applied to the cathode paste with a roll press or the like in order to increase the electrode density. In this way, a sheet-shaped cathode can be produced. A sheet-shaped cathode can be used in the production of a battery by cutting the cathode to an appropriate size according to the purpose of use and the kind of battery. However, the production method for a cathode is not limited to this example, and other methods may also be used.

When producing the cathode, it is possible to use, for example, graphite (natural graphite, artificial graphite, expanded graphite, and the like), or a carbon black material such as acetylene black, Ketjen black, and the like as the conductive material.

The binding agent serves the role of binding together particles of active material, and, for example, it is possible to use polyvinylidene fluoride (PVDF), polytetrafluoroethylene (PTFE), fluororubber, ethylene propylene diene rubber, styrene-butadiene, cellulose resin, polyacrylic acid and the like.

As necessary, the cathode active material, conductive material, and activated carbon are dispersed and a solvent in which a binding agent is dissolved is added to the cathode mixture. More specifically, an organic solvent such as N-methyl-2-pyrrolidone can be used as the solvent. Moreover, in order to increase the electric double-layer capacity, activated carbon can be added to the cathode mixture.

(Anode)

An anode that is formed by coating an anode mixture, which is made into a paste by mixing a binding agent with metal lithium, lithium alloy or the like, or an anode active material that can absorb or desorb lithium ions, and then adding a suitable solvent, onto the surface of a metal foil collector such as a copper foil collector, drying and as necessary, compressing to increase the electrode density can be used as the anode.

As the anode active material, it is possible to use, for example, natural graphite, artificial graphite, organic composite sintered body such as phenol resin, or a powdered carbon material such as coke. In this case, as the anode binding agent, as in the case of the cathode, it is possible to use a fluorine-containing resin such as PVDF, and as the solvent for dispersing the active material and binding agent, it is possible to use an organic solvent such as N-methyl-2-pyrrolidone and the like.

(Separator)

The separator is arranged between the cathode and the anode, and has the function of separating the cathode and anode and holding the electrolyte. A thin film of polyethylene, polypropylene and the like, and that has a large number of minute holes can be used as the separator, however, the separator material is not particularly limited as long as the separator has the functions above.

(Non-Aqueous Electrolyte)

The non-aqueous electrolyte is an electrolyte wherein a lithium salt as a supporting electrolyte is dissolved in an organic solvent.

As the organic solvent, it is possible to use a single kind or a mixture of two or more kinds selected from: a cyclic carbonate such as ethylene carbonate, propylene carbonate, butylene carbonate, trifluoro propylene carbonate and the like; a chain carbonate such as diethyl carbonate, dimethyl carbonate, ethyl methyl carbonate, dipropyl carbonate and the like; an ether compound such as tetrahydrofuran, 2-methyltetrahydrofuran, dimethoxyethane and the like; a sulfur compound such as ethyl methyl sulfone, butane sultone and the like; and a phosphorus compound such as triethyl phosphate, trioctyl phosphate and the like.

As the supporting electrolyte, it is possible to use $LiPF_6$, $LiBF_4$, $LiClO_4$, $LiAsF_6$, $LiN(CF_3SO_2)_2$ and the like, or a composite of these.

Furthermore, the non-aqueous electrolyte can also include a radical scavenger, a surfactant, a flame retardant and the like.

(Battery Shape and Construction)

Various shapes such as a cylindrical shape or layered shape can be used as the shape of the non-aqueous electrolyte secondary battery of the present invention that is formed using the cathode, anode, separator and non-aqueous electrolyte explained above.

No matter what shape is used, electrodes are formed by layering the cathode and anode by way of the separator, and the electrodes are then impregnated with the non-aqueous electrolyte, then collector leads or the like are used to connect between the cathode collector and a cathode terminal that goes to the outside, and between the anode collector and an anode terminal that goes to the outside; this is then sealed in a battery case to complete the non-aqueous electrolyte secondary battery.

(f) Characteristics

The non-aqueous electrolyte secondary battery of the present invention is constructed as described above and has a cathode that uses the cathode active material of the present invention, so, for example, in the case of a CR2032 battery that is constructed in the examples that will be described later, the initial discharge capacity can be made to be 190 mAh/g or greater. Therefore, it is possible to achieve a high-capacity secondary battery.

EXAMPLES

The present invention will be explained in further detail using examples and comparative examples, however, the present invention is not limited by any of the examples.

In the examples and comparative examples below, measurements of the volume-average particle size (MV) and particle size distribution were evaluated from the measurement results of a laser diffraction particle size distribution meter (Microtrac, manufactured by Nikkiso Co., Ltd.). Moreover, external observation of particles was performed using a scanning electron microscope (S-4700, manufactured by Hitachi High-Technologies Corporation). Furthermore, the compositions of the nickel composite hydroxide, nickel composite oxide and cathode active material were measured using ICP atomic emission spectroscopy (ICPS-8100, manufactured by Shimadzu Corporation).

In the examples, unless specified otherwise, special grade chemicals manufactured by Wako Pure Chemical Industries, Ltd. were used in test samples in the production of the nickel composite hydroxide and cathode active material (lithium nickel composite oxide).

Example 1

An aqueous solution before reaction was obtained by placing 900 ml of pure water into a 5 L reaction vessel to which four baffle plates are attached, then after heating at 70° C. using a thermostatic bath and warming jacket, adding a sodium hydroxide aqueous solution (25%), and adjusting the pH value at a standard liquid temperature of 25° C. to 10.6.

On the other hand, a composite aqueous solution of nickel sulfate (Ni molar concentration: 1.69 ml/L) and cobalt sulfate (Co molar concentration: 0.31 ml/L) was prepared as a raw material aqueous solution.

In example 1, using the aqueous solutions above, the volume-average particle size (MV) of the target nickel composite hydroxide was set to be 15.0 µm to 15.5 µm, and the primary crystallization process and secondary crystallization process were performed while controlling the crystallization conditions so that the volume-average particle size ratio was within the range 0.55 to 0.60.

The primary crystallization process was performed by supplying the raw aqueous solution at 12.9 ml/min using a constant rate pump while stirring in a state with the aqueous solution before reaction maintained at 70° C. When doing this, a nickel composite hydroxide slurry having a concentration of 100 g/L (1.1 mol/L) was obtained by continuously supplying 25% by mass sodium hydroxide aqueous solution as a neutralizer, and performing control so that the pH value at a standard liquid temperature of 25° C. was 10.6. Stirring was performed using a 85 mm diameter 6-blade inclined paddle (inclination angle: 45 degrees), and the rotational speed was controlled to be 800 rpm.

At the instant when the reaction vessel became full after four hours from the start of the reaction, the volume-average particle size (MV) of the nickel composite hydroxide was 8.9 μm.

The secondary crystallization process was performed by continuing crystallization by maintaining the crystallization conditions of the primary crystallization process and performing concentration by operating a cross-flow filtration unit (MEMBARALOX, manufactured by Pall Corporation), then removing only the liquid component of the slurry while keeping the amount of slurry in the reaction vessel constant. When doing this, the slurry was supplied to the cross-flow filtration unit using an air diaphragm pump (NDP-5FPT, manufactured by Yamada Corporation), and the slurry was continuously concentrated by adjusting the filtration pressure. An alumina filter having a pore size of 0.5 μm was used as the filter for the cross-flow filtration unit.

After 32 hours from the start of the reaction (28 hours from the start of the secondary crystallization process), pumping of all of the liquids was stopped, and the crystallization reaction was ended. The slurry after the crystallization reaction ended was separated into liquid and solid, then washed and dried to obtain a powdered nickel composite hydroxide. This nickel composite hydroxide had a volume-average particle size (MV) of 15.4 μm, a volume-average particle size ratio of 0.58, and (D90–D10)/MV of 0.49. Moreover, the external appearance and cross section of the nickel composite hydroxide were observed using SEM and it was confirmed that the nickel composite hydroxide was composed of spherical secondary particles formed from an aggregation of primary particles, with the primary particles being plate shaped or needle shaped with a length in the short diameter direction of 0.04 μm. The average particle size of the primary particles was found by measuring the maximum length of 50 or more primary particles and taking the average (this was also performed in the same way in Examples 2 to 9 and Comparative Examples 1 to 4). Furthermore, through ICP atomic emission spectroscopy, it was confirmed that the nickel composite hydroxide could be expressed by the general expression: $Ni_{0.84}Co_{0.16}(OH)_2$.

Example 2

Except for setting the volume-average particle size (MV) of the target nickel composite hydroxide to be 22.0 μm to 22.5 μm, and extending the reaction time to 80 hours (making the reaction time of the secondary crystallization process 76 hours), so that the volume-average particle size ratio was within the range 0.35 to 0.40, nickel composite hydroxide was obtained in the same way as in Example 1.

This nickel composite hydroxide had a volume-average particle size (MV) of 22.0 μm, a volume-average particle size ratio of 0.40, and (D90–D10)/MV of 0.46. Moreover, the external appearance and cross section of the nickel composite hydroxide were observed using SEM and it was confirmed that the nickel composite hydroxide was composed of spherical secondary particles formed from an aggregation of primary particles, with the primary particles being plate shaped or needle shaped with a length in the short diameter direction of 0.06 μm. Furthermore, through ICP atomic emission spectroscopy, it was confirmed that the nickel composite hydroxide could be expressed by the general expression: $Ni_{0.84}Co_{0.16}(OH)_2$.

Example 3

Except for setting the volume-average particle size (MV) of the target nickel composite hydroxide to be 9.5 μm to 10.0 μm, and making the temperature of the slurry in the primary crystallization process and secondary crystallization process 80° C., so that the volume-average particle size ratio was within the range 0.45 to 0.50, nickel composite hydroxide was obtained in the same way as in Example 1.

This nickel composite hydroxide had a volume-average particle size (MV) of 9.7 μm, a volume-average particle size ratio of 0.46, and (D90–D10)/MV of 0.48. Moreover, the external appearance and cross section of the nickel composite hydroxide were observed using SEM and it was confirmed that the nickel composite hydroxide was composed of spherical secondary particles formed from an aggregation of primary particles, with the primary particles being plate shaped or needle shaped with a length in the short diameter direction of 0.05 μm. Furthermore, through ICP atomic emission spectroscopy, it was confirmed that the nickel composite hydroxide could be expressed by the general expression: $Ni_{0.84}Co_{0.16}(OH)_2$.

Example 4

Except for setting the volume-average particle size (MV) of the target nickel composite hydroxide to be 13.5 μm to 14.0 μm, and making the pH value in the primary crystallization process at a standard liquid temperature of 25° C. 10.6, and the pH value in the secondary crystallization process at a standard liquid temperature of 25° C. 10.2, so that the volume-average particle size ratio was within the range 0.50 to 0.55, nickel composite hydroxide was obtained in the same way as in Example 1.

This nickel composite hydroxide had a volume-average particle size (MV) of 13.6 μm, a volume-average particle size ratio of 0.51, and (D90–D10)/MV of 0.49. Moreover, the external appearance and cross section of the nickel composite hydroxide were observed using SEM and it was confirmed that the nickel composite hydroxide was composed of spherical secondary particles formed from an aggregation of primary particles, with the primary particles being plate shaped or needle shaped with a length in the short diameter direction of 0.05 μm. Furthermore, through ICP atomic emission spectroscopy, it was confirmed that the nickel composite hydroxide could be expressed by the general expression: $Ni_{0.84}Co_{0.16}(OH)_2$.

Example 5

Except for setting the volume-average particle size (MV) of the target nickel composite hydroxide to be 13.5 μm to 14.0 μm, and making the temperature of the slurry in the primary crystallization process 70° C. and the temperature of the slurry in the secondary crystallization process 80° C., so that the volume-average particle size ratio was within the range 0.55 to 0.60, nickel composite hydroxide was obtained in the same way as in Example 1.

This nickel composite hydroxide had a volume-average particle size (MV) of 13.6 μm, a volume-average particle size ratio of 0.59, and (D90–D10)/MV of 0.47. Moreover, the external appearance and cross section of the nickel composite hydroxide were observed using SEM and it was confirmed that the nickel composite hydroxide was composed of spherical secondary particles formed from an aggregation of primary particles, with the primary particles being plate shaped or needle shaped with a length in the short diameter direction of 0.05 μm. Furthermore, through ICP atomic emission spectroscopy, it was confirmed that the nickel composite hydroxide could be expressed by the general expression: $Ni_{0.84}Co_{0.16}(OH)_2$.

Example 6

Except for setting the volume-average particle size (MV) of the target nickel composite hydroxide to be 44.5 μm to 45.0 μm, and extending the secondary crystallization process to 114 hours from the start of reaction (110 hours from the start of the secondary crystallization process), so that the volume-average particle size ratio was within the range 0.20 to 0.25, nickel composite hydroxide was obtained in the same way as in Example 1.

This nickel composite hydroxide had a volume-average particle size (MV) of 44.5 μm, a volume-average particle size ratio of 0.20, and (D90–D10)/MV of 0.51. Moreover, the external appearance and cross section of the nickel composite hydroxide were observed using SEM and it was confirmed that the nickel composite hydroxide was composed of spherical secondary particles formed from an aggregation of primary particles, with the primary particles being plate shaped or needle shaped with a length in the short diameter direction of 0.05 μm. Furthermore, through ICP atomic emission spectroscopy, it was confirmed that the nickel composite hydroxide could be expressed by the general expression: $Ni_{0.84}Co_{0.16}(OH)_2$.

Example 7

Except for making the temperature of the slurry in the primary crystallization process and secondary crystallization process 90° C., nickel composite hydroxide was obtained in the same way as in Example 1.

This nickel composite hydroxide had a volume-average particle size (MV) of 28.1 μm, a volume-average particle size ratio of 0.51, and (D90–D10)/MV of 0.47. Moreover, the external appearance and cross section of the nickel composite hydroxide were observed using SEM and it was confirmed that the nickel composite hydroxide was composed of spherical secondary particles formed from an aggregation of primary particles, with the primary particles being plate shaped or needle shaped with a length in the short diameter direction of 0.05 μm. Furthermore, through ICP atomic emission spectroscopy, it was confirmed that the nickel composite hydroxide could be expressed by the general expression: $Ni_{0.84}Co_{0.16}(OH)_2$.

Example 8

Except for making the pH value at a standard liquid temperature of 25° C. 13.0 in the primary crystallization process, nickel composite hydroxide was obtained in the same way as in Example 1.

This nickel composite hydroxide had a volume-average particle size (MV) of 9.1 μm, a volume-average particle size ratio of 0.48, and (D90–D10)/MV of 0.50. Moreover, the external appearance and cross section of the nickel composite hydroxide were observed using SEM and it was confirmed that the nickel composite hydroxide was composed of spherical secondary particles formed from an aggregation of primary particles, with the primary particles being plate shaped or needle shaped with a length in the short diameter direction of 0.05 μm. Furthermore, through ICP atomic emission spectroscopy, it was confirmed that the nickel composite hydroxide could be expressed by the general expression: $Ni_{0.84}Co_{0.16}(OH)_2$.

Example 9

Except for making the temperature of the slurry in the primary crystallization process 40° C., nickel composite hydroxide was obtained in the same way as in Example 1.

This nickel composite hydroxide had a volume-average particle size (MV) of 8.4 μm, a volume-average particle size ratio of 0.58, and (D90–D10)/MV of 0.49. Moreover, the external appearance and cross section of the nickel composite hydroxide were observed using SEM and it was confirmed that the nickel composite hydroxide was composed of spherical secondary particles formed from an aggregation of primary particles, with the primary particles being plate shaped or needle shaped with a length in the short diameter direction of 0.05 μm. Furthermore, through ICP atomic emission spectroscopy, it was confirmed that the nickel composite hydroxide could be expressed by the general expression: $Ni_{0.84}Co_{0.16}(OH)_2$.

Comparative Example 1

Except for making the temperature of the slurry in the primary crystallization process and secondary crystallization process 60° C., nickel composite hydroxide was obtained in the same way as in Example 1.

This nickel composite hydroxide had a volume-average particle size (MV) of 3.2 μm, a volume-average particle size ratio of 0.48, and (D90–D10)/MV of 1.31. Moreover, the external appearance and cross section of the nickel composite hydroxide were observed using SEM and it was confirmed that the nickel composite hydroxide was composed of spherical secondary particles formed from an aggregation of primary particles, with the primary particles being plate shaped or needle shaped with a length in the short diameter direction of 0.03 μm. Furthermore, through ICP atomic emission spectroscopy, it was confirmed that the nickel composite hydroxide could be expressed by the general expression: $Ni_{0.84}Co_{0.16}(OH)_2$.

From the above, it was confirmed that when the slurry temperature in both the primary crystallization process and secondary crystallization process is too low, the amount of fine particles increases and the particles have a wide particle size distribution.

Comparative Example 2

Except for making the pH value in the secondary crystallization process 11.5 at a standard liquid temperature of 25° C., nickel composite hydroxide was obtained in the same way as in Example 1.

This nickel composite hydroxide had a volume-average particle size (MV) of 2.6 μm, a volume-average particle size ratio of 0.81, and (D90–D10)/MV of 1.51. Moreover, the external appearance and cross section of the nickel composite hydroxide were observed using SEM and it was confirmed that the nickel composite hydroxide was composed of spherical secondary particles formed from an aggregation of primary particles, with the primary particles being plate shaped or needle shaped with a length in the short diameter direction of 0.03 μm. Furthermore, through ICP atomic emission spectroscopy, it was confirmed that the nickel composite hydroxide could be expressed by the general expression: $Ni_{0.84}Co_{0.16}(OH)_2$.

From the above, it was confirmed that when the pH value in the secondary crystallization process is too high, fine particles are generated and the particles have a wide particle size distribution.

Comparative Example 3

Except for making the pH value in the secondary crystallization process 9.5 at a standard liquid temperature of 25° C., nickel composite hydroxide was obtained in the same way as in Example 1.

This nickel composite hydroxide had a volume-average particle size (MV) of 5.7 μm, a volume-average particle size ratio of 0.76, and (D90–D10)/MV of 1.63. Moreover, the external appearance and cross section of the nickel composite hydroxide were observed using SEM and it was confirmed that the nickel composite hydroxide was composed of spherical secondary particles formed from an aggregation of primary particles, with the primary particles being plate shaped or needle shaped with a length in the short diameter direction of 0.02 μm. Furthermore, through ICP atomic emission spectroscopy, it was confirmed that the nickel composite hydroxide could be expressed by the general expression: $Ni_{0.84}Co_{0.16}(OH)_2$.

From the above, it was confirmed that when the pH value in the secondary crystallization process is too low, irregular shaped particles are generated and the particles have a wide particle size distribution.

Comparative Example 4

Except for setting the volume-average particle size (MV) of the target nickel composite hydroxide to be 17.5 μm to 22.5 μm, using a 85 mm diameter 6-blade inclined paddle (inclination angle: 45 degrees), and controlling the rotational speed of stirring in the primary crystallization process to 40 rpm, nickel composite hydroxide was obtained in the same way as in Example 1.

This nickel composite hydroxide had a volume-average particle size (MV) of 17.6 μm, a volume-average particle size ratio of 0.84, and (D90–D10)/MV of 0.84. Moreover, the external appearance and cross section of the nickel composite hydroxide were observed using SEM and it was confirmed that the nickel composite hydroxide was composed of spherical secondary particles formed from an aggregation of primary particles, with the primary particles being plate shaped or needle shaped with a length in the short diameter direction of 0.04 μm. Furthermore, through ICP atomic emission spectroscopy, it was confirmed that the nickel composite hydroxide could be expressed by the general expression: $Ni_{0.84}Co_{0.16}(OH)_2$.

From the above, it was confirmed that when the volume-average particle size ratio of the secondary particles obtained in the primary crystallization process with respect to the volume-average particle size (MV) of the secondary particles obtained in the secondary crystallization process becomes greater than 0.6, the particle size distribution of the secondary particles obtained becomes wide.

Comparative Example 5

Except for setting the volume-average particle size (MV) of the target nickel composite hydroxide to be 8.0 μm, making the temperature of the slurry in the primary crystallization process 50° C., controlling the stirring rotational speed to 1500 rpm, and continuing the reaction for 200 hours from the start of the secondary crystallization process in order that the volume-average particle size ratio became 0.15, nickel composite hydroxide was obtained in the same way as in Example 1. This nickel composite hydroxide had a volume-average particle size (MV) of 0.9 μm at the end of the primary crystallization process, and at 200 hours after the start of the secondary crystallization process the volume-average particle size (MV) was 6.0 μm, the volume-average particle size ratio was 0.15, and (D90–D10)/MV was 0.55.

After that, when trying to extend the reaction time until the volume-average particle size (MV) became the target value, the slurry viscosity became too high, so the power of mixer was insufficient and it was not possible to continue the crystallization process.

From the above, it was confirmed that when the volume-average particle size ratio of the secondary particles obtained in the primary crystallization process with respect to the volume-average particle size (MV) of the secondary particles obtained in the secondary crystallization process was set to be less than 0.2, it was difficult to obtain particles that were 8.0 μm or greater, and the particle size distribution became worse due to nucleation in the secondary crystallization process.

Example 10

The nickel composite hydroxides that were produced in Examples 1 to 9 and Comparative Example 1 to 4 were moved to different reaction vessels and mixed with water at normal temperature to make a slurry, then sodium aluminate aqueous solution and sulfuric acid was added to this mixed aqueous solution while stirring to adjust the pH value of the slurry to 9.5. After that, by continuing stirring for one hour, the surfaces of the secondary particles of nickel composite hydroxide were covered with aluminum hydroxide. When doing this, the aqueous solution of sodium aluminate was added so that the molar ratio of metal elements in the slurry was nickel:cobalt:aluminum=0.84:0.12:0.04. After stirring was stopped, the sodium aluminate aqueous solution was filtered and washed, to obtain nickel composite hydroxide that was covered with aluminum hydroxide.

This nickel composite hydroxide was roasted in an air atmosphere for 6 hours at 700° C. The volume-average particle size (MV), (D90–D10)/MV and composition of the secondary particles of the obtained nickel composite oxide are given in Table 2. As a result, when the nickel composite hydroxide that was produced using the production method of the present invention was used as a precursor, it was found that a nickel composite oxide having a particle size distribution index (D90–D10)/MV less than 0.5 is obtained.

Example 11

Lithium hydroxide was weighed so that Li/Me+1.02 (u=0.02), and a mixture was formed by mixing together the nickel composite hydroxide that was obtained in Example 1 with the nickel composite hydroxides covered with aluminum hydroxides that were obtained from Example 10 (hydroxides that used the nickel composite hydroxides of Examples 1 to 9 and Comparative Example 1 to 4). Mixing was performed using a shaker mixer (TURBULA Type T2C, manufactured by Willy A. Bachofen (WAB)).

The obtained mixture was calcined for 8 hours in a flow of oxygen (oxygen; 100% by volume) at a calcination temperature of 750° C. and rate of temperature rise from room temperature to the calcination temperature of 2.5°

C./min, then after cooling was crushed to obtain a cathode active material. From X-ray diffraction, the obtained cathode active material was confirmed to be a single-phase lithium nickel composite oxide having hexagonal crystals. The volume-average particle size (MV) and (D90−D10)/MV of the secondary particles of the cathode active material, and the crystallite diameter found using the Scherrer method from the (003) plane peak in X-ray diffraction are given in Table 3. From Table 3, it is confirmed that when the nickel composite hydroxide or nickel composite oxide that was produced using the production method of this invention is used as raw material, a cathode active material having a good particle size distribution and proper crystallite diameter is obtained.

Example 12

Figure 3:
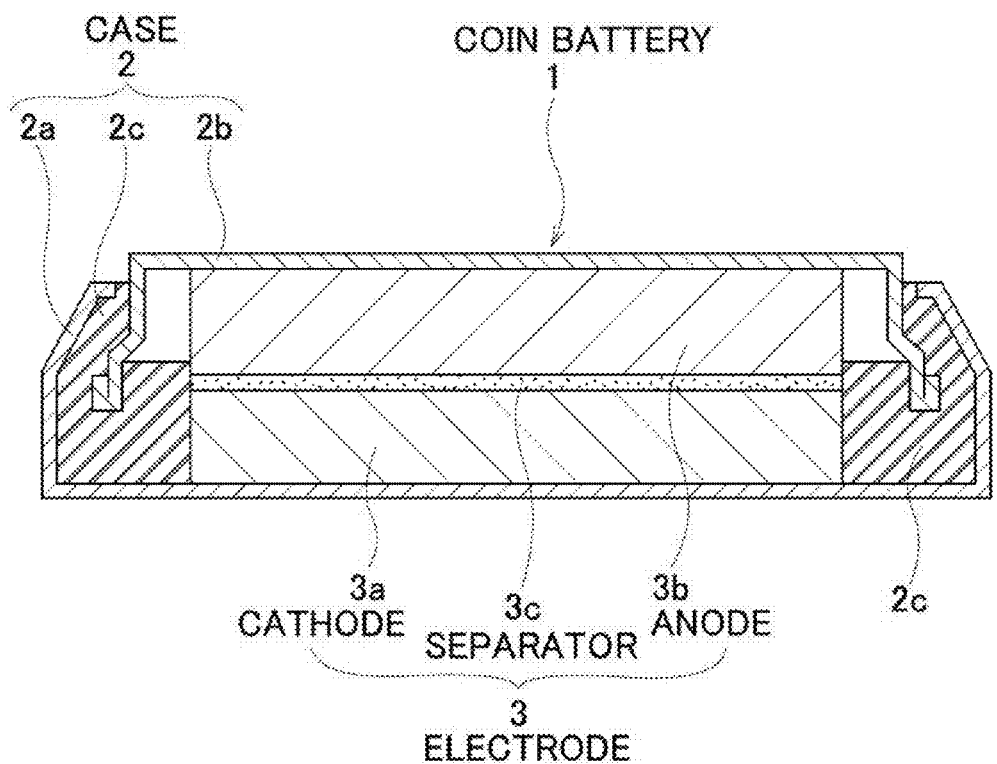
FIG. 3 is a cross-sectional view of a CR2032 battery that was used for evaluation.

Next, the cathode active material that was obtained in Example 11 was used to produce a coin battery 1 as illustrated in FIG. 3, and the characteristics of that battery were evaluated.

[Production of Non-Aqueous Electrolyte Secondary Battery]

A coin battery 1 is formed from a case 2 and an electrode 3 that is housed inside the case 2.

The case 2 has a cathode can 2a that is hollow and open on one end, and an anode can 2b that is located in the opening of the cathode can 2a, and when the anode can 2b is placed in the opening of the cathode can 2a, a space is formed between the anode can 2b and cathode can 2a for housing the electrode 3.

The electrode 3 has a cathode 3a, a separator 3c and an anode 3b, which are layered in that order, and is housed inside the case 2 so that the cathode 3a comes in contact with the inside surface of the cathode can 2a, and the anode 3b comes in contact with the inside surface of the anode can 2b.

The case 2 has a gasket 2c, and this gasket 2c is fixed so that an electrically insulated state is maintained between the cathode can 2a and the anode can 2b. The gasket 2c seals the space between the cathode can 2a and the anode can 2b, and has the function of sealing the space between the inside of the case 2 and the outside so as to be airtight and fluid-tight.

This coin battery 1 was produced as described below. First, 52.5 mg of the obtained cathode active material, 15 mg of acetylene black, and 7.5 mg of polytetrafluoroethylene resin (PTFE) were mixed, and pressed at a pressure of 100 MPa to form a cathode 3a having a diameter of 11 mm and thickness of 100 μm. This cathode 3a was then dried in a vacuum drier for 12 hours at 120° C. Using this cathode 3a, anode 3b, separator 3c and electrolyte, a coin battery 1 was produced in a glovebox in an Ar (argon) atmosphere that was controlled so that the dew point was −80° C.

As the anode 3, an anode sheet formed by coating graphite powder having an average particle size of 20 μm and polyvinylidene fluoride on copper foil and punched into a disk shape having a diameter of 14 mm, were used. Moreover, polyethylene porous film having a thickness of 25 μm was used for the separator 3c. A solution of ethylene carbonate (EC) and diethyl carbonate (DEC) mixed in equal parts (manufactured by Tomiyama Pure Chemical Industries, Ltd.) with 1M of $LiClO_4$ as a supporting electrolyte was used as the electrolyte solution.

[Evaluation of Battery Characteristics]

The following evaluation was performed for the obtained coin battery 1.

(a) Initial Discharge Capacity

The coin battery 1 was left for 24 hours after production, and after the open circuit voltage (OCV) stabilized, was charged to a cutoff voltage of 4.3 V with a current density with respect to the cathode of 0.1 mA/cm$^2$, and after charging was stopped for 1 hour, the capacity when discharged to a cutoff voltage of 3.0 V was evaluated as being the initial discharge voltage.

(b) Cathode Resistance (Rct)

Figure 4:
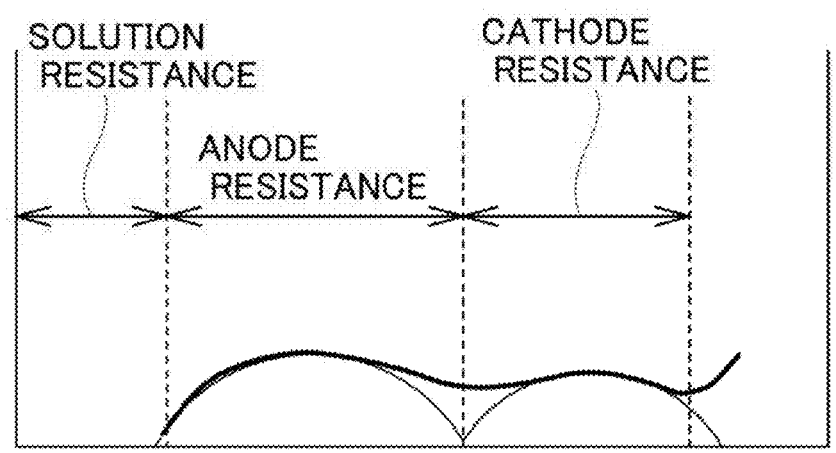
FIG. 4 is a drawing for explaining an equivalent circuit that was used in a measurement example in impedance evaluation and analysis.
Figure 4:
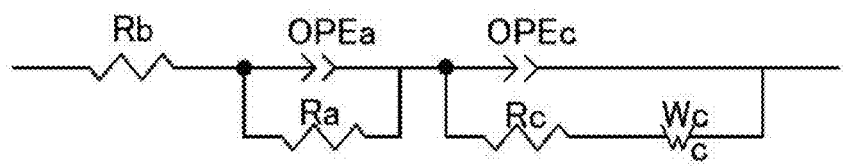

The coin battery 1 was charged to a charging potential of 4.1 V, then using a frequency response analyzer and a potentio-galvanostat (1255B, manufactured by Solartron), measurement was performed according to the alternating current impedance method, and the Nyquist plot in FIG. 4 was obtained. This Nyquist plot expresses the sum of the characteristic curves indicating the solution resistance, the anode resistance and capacity, and cathode resistance and capacity, so the value of the cathode resistance was determined by the fitting calculation using an equivalent circuit based on this Nyquist plot.

The evaluation results are given in Table 3.

TABLE

| | (Nickel Composite Hydroxide) | | | | | | | |
|---|---|---|---|---|---|---|---|---|
| | Reaction Time (h) | Reaction pH Value | Volume-Average Particle Size Ratio | Reaction Temperature (° C.) | Stirring Rotational Speed (rpm) | Volume-Average Particle Size of Secondary Particles (μm) | (D90 − D10)/ MV | Length in Short Diameter Direction of Primary Particles (μm) |
| Example 1 | 32 | 10.6 | 0.58 | 70 | 800 | 15.4 | 0.49 | 0.04 |
| Exampla 2 | 80 | 10.6 | 0.40 | 70 | 800 | 22 | 0.46 | 0.06 |
| Example 3 | 32 | 10.6 | 0.46 | 80 | 800 | 9.7 | 0.48 | 0.05 |
| Example 4 | 32 | 10.6/10.2 | 0.51 | 70 | 800 | 13.6 | 0.49 | 0.05 |
| Fxample 5 | 32 | 10.6 | 0.59 | 70/80 | 800 | 13.6 | 0.47 | 0.05 |
| Example 6 | 114 | 10.6 | 0.20 | 70 | 800 | 44.5 | 1.51 | 0.05 |
| Example 7 | 32 | 10.6 | 0.51 | 90 | 800 | 28.1 | 0.47 | 0.05 |
| Example 8 | 32 | 13.0/10.6 | 0.48 | 70 | 800 | 9.1 | 1.50 | 0.05 |
| Example 9 | 32 | 10.6 | 0.58 | 40/70 | 800 | 8.4 | 0.49 | 0.05 |
| Comparative Example 1 | 32 | 10.6 | 0.48 | 60 | 800 | 3.2 | 1.31 | 0.03 |
| Comparative | 32 | 10.6/11.5 | 0.81 | 70 | 800 | 2.6 | 1.51 | 0.03 |

TABLE-continued (Nickel Composite Hydroxide)

| | Reaction Time (h) | Reaction pH Value | Volume-Average Particle Size Ratio | Reaction Temperature (° C.) | Stirring Rotational Speed (rpm) | Volume-Average Particle Size of Secondary Particles (μm) | (D90 − D10)/ MV | Length in Short Diameter Direction of Primary Particles (μm) |
|---|---|---|---|---|---|---|---|---|
| Example 2 | | | | | | | | |
| Comparative Example 3 | 32 | 10.6/9.5 | 0.76 | 70 | 800 | 5.7 | 1.63 | 0.02 |
| Comparative Example 4 | 32 | 10.6 | 0.84 | 70 | 40/1500 | 17.6 | 0.84 | 0.04 |
| Comparative Example 5 | 204 | 10.6 | 0.15 | 50 | 1500 | 6 | 0.55 | — |

TABLE 2

(Nickel Composite Oxide)

| | Volume-Average Particle Size (μm) | (D90−D10)/MV | Composition Ratio |
|---|---|---|---|
| Example 1 | 15.6 | 0.49 | $Ni_{0.84}Co_{0.12}Al_{0.04}O_2$ |
| Example 2 | 22.4 | 0.47 | $Ni_{0.84}Co_{0.12}Al_{0.04}O_2$ |
| Example 3 | 10.0 | 0.48 | $Ni_{0.84}Co_{0.12}Al_{0.04}O_2$ |
| Example 4 | 15.3 | 0.49 | $Ni_{0.84}Co_{0.12}Al_{0.04}O_2$ |
| Example 5 | 14.1 | 0.48 | $Ni_{0.84}Co_{0.12}Al_{0.04}O_2$ |
| Example 6 | 44.7 | 0.49 | $Ni_{0.84}Co_{0.12}Al_{0.04}O_2$ |
| Example 7 | 28.4 | 0.48 | $Ni_{0.84}Co_{0.12}Al_{0.04}O_2$ |
| Example 8 | 9.6 | 0.49 | $Ni_{0.84}Co_{0.12}Al_{0.04}O_2$ |
| Example 9 | 8.7 | 0.48 | $Ni_{0.84}Co_{0.12}Al_{0.04}O_2$ |
| Comparative Example 1 | 3.7 | 1.53 | $Ni_{0.84}Co_{0.12}Al_{0.04}O_2$ |
| Comparative Example 2 | 2.8 | 1.58 | $Ni_{0.84}Co_{0.12}Al_{0.04}O_2$ |
| Comparative Example 3 | 5.9 | 1.7 | $Ni_{0.84}Co_{0.12}Al_{0.04}O_2$ |
| Comparative Example 4 | 18.0 | 0.8 | $Ni_{0.84}Co_{0.12}Al_{0.04}O_2$ |

TABLE 3

(Cathode Active Material)

| | Roasting Temperature (° C.) | Volume-Average Particle Size | (D90 − D10)/ MV | Crystallite Diameter (nm) | Composition Ratio | Initial Discharge Capacity (mAh/g) |
|---|---|---|---|---|---|---|
| Example 1 | Non-Roasting Process | 16.3 | 0.48 | 130 | $Li_{1.02}Ni_{0.84}Co_{0.16}O_2$ | 208 |
| Example 1 | 700 | 13.9 | 0.47 | 105 | $Li_{1.02}Ni_{0.84}Co_{0.12}Al_{0.04}O_2$ | 195 |
| Example 2 | 700 | 20.8 | 0.48 | 113 | $Li_{1.02}Ni_{0.84}Co_{0.12}Al_{0.04}O_2$ | 193 |
| Example 3 | 700 | 9.1 | 0.47 | 95 | $Li_{1.02}Ni_{0.84}Co_{0.12}Al_{0.04}O_2$ | 197 |
| Example 4 | 700 | 13.5 | 0.48 | 110 | $Li_{1.02}Ni_{0.84}Co_{0.12}Al_{0.04}O_2$ | 195 |
| Example 5 | 700 | 12.8 | 0.48 | 116 | $Li_{1.02}Ni_{0.84}Co_{0.12}Al_{0.04}O_2$ | 196 |
| Example 6 | 700 | 42.9 | 0.49 | 138 | $Li_{1.02}Ni_{0.84}Co_{0.12}Al_{0.04}O_2$ | 190 |
| Example 7 | 700 | 27.6 | 0.48 | 112 | $Li_{1.02}Ni_{0.84}Co_{0.12}Al_{0.04}O_2$ | 191 |
| Example 8 | 700 | 9.2 | 0.49 | 101 | $Li_{1.02}Ni_{0.84}Co_{0.12}Al_{0.04}O_2$ | 197 |
| Example 9 | 700 | 8.4 | 0.48 | 96 | $Li_{1.02}Ni_{0.84}Co_{0.12}Al_{0.04}O_2$ | 197 |
| Comparative Example 1 | 700 | 5.8 | 1.68 | 82 | $Li_{1.02}Ni_{0.84}Co_{0.12}Al_{0.04}O_2$ | 185 |
| Comparative Example 2 | 700 | 4.8 | 1.61 | 79 | $Li_{1.02}Ni_{0.84}Co_{0.12}Al_{0.04}O_2$ | 188 |
| Comparative Example 3 | 700 | 7.1 | 1.65 | 86 | $Li_{1.02}Ni_{0.84}Co_{0.12}Al_{0.04}O_2$ | 182 |
| Comparative Example 4 | 700 | 16.9 | 0.78 | 99 | $Li_{1.02}Ni_{0.84}Co_{0.12}Al_{0.04}O_2$ | 191 |

What is claimed is:

1. A method for producing a nickel composite hydroxide,
a nickel composite hydroxide comprising spherical shaped secondary particles of nickel composite hydroxide, the secondary particles formed by an aggregation of plural needle shaped or plate shaped primary particles, with a length in a short-diameter direction of the primary particles being 0.1 μm or less, the volume-average particle size (MV) of the secondary particles being 9.0 μm to 50.0 μm, and (D90-D10)/MV that indicates a relationship of the particles size distribution to the volume-average particle size (MV) being less than 0.5 the method comprising a step of providing an aqueous solution including at least a nickel salt and a neutralizer into a reaction vessel while continuously stirring, forming a reaction aqueous solution and producing the nickel composite hydroxide by a crystallization reaction in a state of not containing a complex ion formation agent for forming complex ions with metal elements in the reaction aqueous solution, the step comprising:

a primary crystallization process of obtaining a nickel composite hydroxide slurry while controlling the crystallization reaction so that a ratio of a volume-average particles size (MV) of secondary particles of nickel composite hydroxide generated in the reaction vessel with respect to a volume-average particle size (MV) of secondary particles of nickel composite hydroxide that are finally obtained is 0.2 to 0.6; and a secondary crystallization process of continuing the crystallization reaction by keeping an amount of the slurry obtained in the primary crystallization process constant by continuously removing only a liquid component of the slurry while maintaining the state of not containing the complex ion formation agent, and performing control so that a temperature of the slurry is in a range of 70° C. to 90° C., and a pH value at a standard liquid temperature of 25° C. of the slurry is in a range of 10.0 to 11.0 until the volume-average particle size (MV) of the secondary particles of nickel composite hydroxide becomes 8.0 μm to 50.0 μm.

2. The method for producing nickel composite hydroxide according to claim 1, wherein in the primary crystallization process control is performed so that a temperature of the slurry is in a range of 70° C. to 90° C., and a pH value at a standard liquid temperature of 25° C. is in a range of 10.0 to 11.0.

3. The method for producing nickel composite hydroxide according to claim 1, wherein a composition of the aqueous solution including the nickel salt is adjusted so that the nickel composite hydroxide has a composition ratio that is expressed by a general expression: $Ni_{1-x-y}Co_xM_y(OH)_{2+A}$, where $0 \le x \le 0.35$, $0 \le y \le 0.35$, $0 \le A \le 0.5$, and M is at least one additional element selected from Mn, V, Mg, Al, Ti, Mo, Nb, Zr and W.

4. The method for producing nickel composite hydroxide according to claim 1, wherein a composition of the aqueous solution including the nickel salt is adjusted so that the nickel composite hydroxide has a composition ratio that is expressed by a general expression: $Ni_{1-x-y}Co_xM_y(OH)_{2+A}$, where $0 \le x \le 0.22$, $0 \le y \le 0.15$, $x+y<0.3$, $0 \le A \le 0.5$, and M is at least one additional element selected from Mn, V, Mg, Al, Ti, Mo, Nb, Zr and W.

5. The method for producing nickel composite hydroxide according to claim 2, wherein in the secondary crystallization process, crystallization is continued until the volume-average particle size (MV) of the nickel composite hydroxide becomes 18.0 μm to 50.0 μm.

6. The method for producing nickel composite hydroxide according to claim 1, wherein in the secondary crystallization process, a cross-flow filtration unit is used to keep the amount of slurry fixed.

7. The method for producing nickel composite hydroxide according to claim 6, wherein a ceramic filter is used as a filter material of the cross-flow filtration unit.

8. A nickel composite hydroxide comprising:
spherical shaped secondary particles of nickel composite hydroxide, the secondary particles formed by an aggregation of plural needle shaped or plate shaped primary particles, with a length in a short-diameter direction of the primary particles being 0.1 μm or less, the volume-average particle size (MV) of the secondary particles being 9.0 μm to 50.0 μm, and (D90−D10)/MV that indicates a relationship of the particles size distribution to the volume-average particle size (MV) being less than 0.5.

9. The nickel composite hydroxide according to claim 8 having a composition that is expressed by a general expression: $Ni_{1-x-y}Co_xM_y(OH)_{2+A}$, where $0 \le x \le 0.35$, $0 \le y \le 0.35$, $0 \le A \le 0.5$, and M is at least one additional element selected from Mn, V, Mg, Al, Ti, Mo, Nb, Zr and W.

10. The nickel composite hydroxide according to claim 8 having a composition that is expressed by a general expression: $Ni_{1-x-y}Co_xM_y(OH)_{2+A}$, where $0 \le x \le 0.22$, $0 \le y \le 0.15$, $x+y<0.3$, $0 \le A \le 0.5$, and M is at least one additional element selected from Mn, V, Mg, Al, Ti, Mo, Nb, Zr and W.

11. The nickel composite hydroxide according to claim 8, wherein the volume-average particle size (MV) is 18.0 μm to 50.0 μm.

* * * * *